United States Patent
Ebi et al.

(10) Patent No.: US 9,826,114 B2
(45) Date of Patent: Nov. 21, 2017

(54) IMAGE FORMING APPARATUS HAVING ENERGY SAVING MODE LEARNING FUNCTION AND CONTROLLER THEREFOR

(71) Applicant: SHARP KABUSHIKI KAISHA, Osaka-shi (JP)

(72) Inventors: Yukari Ebi, Osaka (JP); Shinsaku Tohki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 77 days.

(21) Appl. No.: 14/571,042

(22) Filed: Dec. 15, 2014

(65) Prior Publication Data

US 2015/0098103 A1    Apr. 9, 2015

Related U.S. Application Data

(63) Continuation of application No. 13/682,813, filed on Nov. 21, 2012, now abandoned.

(30) Foreign Application Priority Data

Nov. 29, 2011    (JP) ................................. 2011-260001

(51) Int. Cl.
| | |
|---|---|
| H04N 1/00 | (2006.01) |
| G06K 15/02 | (2006.01) |
| G06F 3/12 | (2006.01) |
| G06K 15/00 | (2006.01) |
| G06F 1/32 | (2006.01) |
| H04N 1/32 | (2006.01) |

(52) U.S. Cl.
CPC ....... *H04N 1/00896* (2013.01); *G06F 1/3284* (2013.01); *G06F 3/1221* (2013.01);
(Continued)

(58) Field of Classification Search
CPC ........... H04N 1/00896; H04N 1/32106; H04N 1/00832; H04N 2201/0098;
(Continued)

(56) References Cited

U.S. PATENT DOCUMENTS

| | | |
|---|---|---|
| 2002/0191035 A1 | 12/2002 | Selent |
| 2003/0163747 A1 | 8/2003 | Yoshikawa |

(Continued)

FOREIGN PATENT DOCUMENTS

| | | |
|---|---|---|
| JP | 8-69222 A | 3/1996 |
| JP | 10-149052 A | 6/1998 |

(Continued)

OTHER PUBLICATIONS

Office Action dated Jan. 2, 2013 from Co-Pending U.S. Appl. No. 13/106,014.

(Continued)

*Primary Examiner* — Kent Yip
(74) *Attorney, Agent, or Firm* — Birch, Stewart, Kolasch & Birch, LLP

(57) ABSTRACT

An energy saving setting unit controls an image forming apparatus that makes a transition to a power saving state if a transition time passes without any prescribed operation in a normal state, and it includes: a unit for storing specific day information distinguishing a normal operation day and a specific day; an auto pattern updating unit determining the transition time in a normal operation day based on past operational status of the normal operation day of the image forming apparatus; a specific day pattern registering unit receiving and storing setting of the transition time of the specific day; and a switching unit, switching the state of conduction of the image forming apparatus using the transition time determined by the auto pattern updating unit and the stored transition time, on the normal operation day and on the specific day, respectively, based on the specific day information.

11 Claims, 24 Drawing Sheets

(52) U.S. Cl.
CPC .......... *G06F 3/1229* (2013.01); *G06F 3/1273* (2013.01); *G06F 3/1285* (2013.01); *G06K 15/02* (2013.01); *G06K 15/4055* (2013.01); *H04N 1/00832* (2013.01); *H04N 1/32106* (2013.01); *G06F 3/1204* (2013.01); *H04N 2201/0094* (2013.01); *H04N 2201/0098* (2013.01); *H04N 2201/3204* (2013.01); *H04N 2201/3273* (2013.01); *H04N 2201/3274* (2013.01); *Y02B 60/1267* (2013.01); *Y02B 60/1271* (2013.01); *Y02B 60/32* (2013.01)

(58) Field of Classification Search
CPC ... H04N 2201/3204; H04N 2201/3273; H04N 2201/3274; G06K 15/4055; G06K 15/02; Y02B 60/1271; G06F 3/1285; G06F 3/1273; G06F 3/1229; G06F 1/3284; G06F 3/1221
USPC ................................................ 358/1.13–1.15
See application file for complete search history.

(56) References Cited

U.S. PATENT DOCUMENTS

| | | |
|---|---|---|
| 2005/0047279 A1 | 3/2005 | Ito |
| 2007/0059014 A1 | 3/2007 | Oka |
| 2008/0260416 A1 | 10/2008 | Nosaki |
| 2011/0182597 A1 | 7/2011 | Motoyama |
| 2011/0279848 A1* | 11/2011 | Watabe et al. ............... 358/1.13 |

FOREIGN PATENT DOCUMENTS

| | | |
|---|---|---|
| JP | 2002-63004 A | 2/2002 |
| JP | 2003-114786 A | 4/2003 |
| JP | 2003-246117 A | 9/2003 |
| JP | 2004-101919 A | 4/2004 |
| JP | 2004-259222 A | 9/2004 |
| JP | 2005-71269 A | 3/2005 |
| JP | 2006-76214 A | 3/2006 |
| JP | 2007-30325 A | 2/2007 |
| JP | 2008-72391 A | 3/2008 |
| JP | 2008-160296 A | 7/2008 |
| JP | 2009-31977 A | 2/2009 |
| JP | 2009-64177 A | 3/2009 |
| JP | 2009-69910 A | 4/2009 |
| JP | 2009-279919 A | 12/2009 |
| JP | 2011-237721 A | 11/2011 |

OTHER PUBLICATIONS

Office Action dated May 28, 2013 from Co-Pending U.S. Appl. No. 13/106,014.

* cited by examiner

| JOB ID | JOB MODE | COMPUTER NAME | USER NAME | LOG-IN NAME | START DATE AND TIME | END DATE AND TIME | DAY OF THE WEEK | NUMBER OF OUTPUTS |
|---|---|---|---|---|---|---|---|---|
| 10001 | COPY | N/A | WITHOUT AUTHENTICATION | WITHOUT AUTHENTICATION | 2009/7/13 1:31'30 | 2009/7/13 1:31'45 | MON | 1 |
| 10002 | COPY | N/A | WITHOUT AUTHENTICATION | WITHOUT AUTHENTICATION | 2009/7/13 1:31'15 | 2009/7/13 1:31'51 | MON | 2 |
| 10003 | COPY | N/A | WITHOUT AUTHENTICATION | WITHOUT AUTHENTICATION | 2009/7/13 1:32'20 | 2009/7/13 1:32'58 | MON | 2 |
| 10004 | COPY | N/A | WITHOUT AUTHENTICATION | WITHOUT AUTHENTICATION | 2009/7/17 6:52'56 | 2009/7/17 6:53'30 | FRI | 2 |
| 10005 | PRINTER | ASX-CLDC12 | Tanaka Akihiko | S004659 | 2009/7/20 6:13'28 | 2009/7/20 6:14'46 | MON | 6 |
| 10006 | PRINTER | ASX-CLF142-2 | Fukumori Tetsuji | S005791 | 2009/7/21 1:26'47 | 2009/7/21 1:31'11 | TUE | 1 |
| 10007 | PRINTER | ASX-CLF142-2 | Fukumori Tetsuji | S005791 | 2009/7/21 1:26'53 | 2009/7/21 1:32'48 | TUE | 1 |
| 10008 | PRINTER | ASX-CLF142-2 | Fukumori Tetsuji | S005791 | 2009/7/21 1:35'34 | 2009/7/21 1:36'03 | TUE | 1 |
| 10009 | PRINTER | ASX-CLF142-2 | Fukumori Tetsuji | S005791 | 2009/7/21 1:35'10 | 2009/7/21 1:36'41 | TUE | 1 |
| 10010 | PRINTER | ASX-CLF142-2 | Fukumori Tetsuji | S005791 | 2009/7/22 3:43'21 | 2009/7/22 3:43'39 | WED | 1 |
| 10011 | COPY | N/A | Kotani Miyuki | S001588 | 2009/8/19 9:29'59 | 2009/8/19 9:30'31 | WED | 8 |

FIG. 8

ENERGY SAVING SETTING

350—(REGISTER) (UPDATE)—352    (SPECIFIC DAY OPERATION SETTING)—660

OPERATION MODE: ○ AUTO MODE ✗—354
⦿ MANUAL MODE [USER PATTERN 1 ▼]—356

CURRENT ENERGY SAVING PATTERN

| FROM | MON | TUE | WED | THU | FRI | SAT | SUN |
|---|---|---|---|---|---|---|---|
| 0:00 | | | | | | | |
| 1:00 | | | | | | | |
| 2:00 | | | | | | | |
| 3:00 | | | | | | | |
| 4:00 | | | | | | | |
| 5:00 | | | | | | | |
| 6:00 | | | | | | | |
| 7:00 | | | | | | | |
| 8:00 | | | | | | | |
| 9:00 | | | | | | | |
| 10:00 | | | | | | | |
| 11:00 | | | | | | | |
| 12:00 | | | | | | | |
| 13:00 | | | | | | | |
| 14:00 | | | | | | | |
| 15:00 | | | | | | | |
| 16:00 | | | | | | | |
| 17:00 | | | | | | | |
| 18:00 | | | | | | | |
| 19:00 | | | | | | | |
| 20:00 | | | | | | | |
| 21:00 | | | | | | | |
| 22:00 | | | | | | | |
| 23:00 | | | | | | | |

358

▨ HIGH PERFORMANCE  ▨ PERFORMANCE  ▨ BALANCE  ▨ POWER SAVING

360—☑ EDIT USER PATTERN

ENERGY SAVING PATTERN: [POWER SAVING ▼]—362
DAY OF THE WEEK: [SUNDAY ▼]—364    366              368
TIME:            START TIME: [0:00 ▼]  END TIME: [0:00 ▼]
                 (TABLE UPDATE)—370

ENERGY SAVING PATTERN NAME: [USER PATTERN 1]  (DOUBLE BYTE/SINGLE BYTE
(SAVE USER PATTERN)—374        372             UP TO TEN CHARACTERS)

380—(REGISTER) (UPDATE)—382    (SPECIFIC DAY OPERATION SETTING)—662

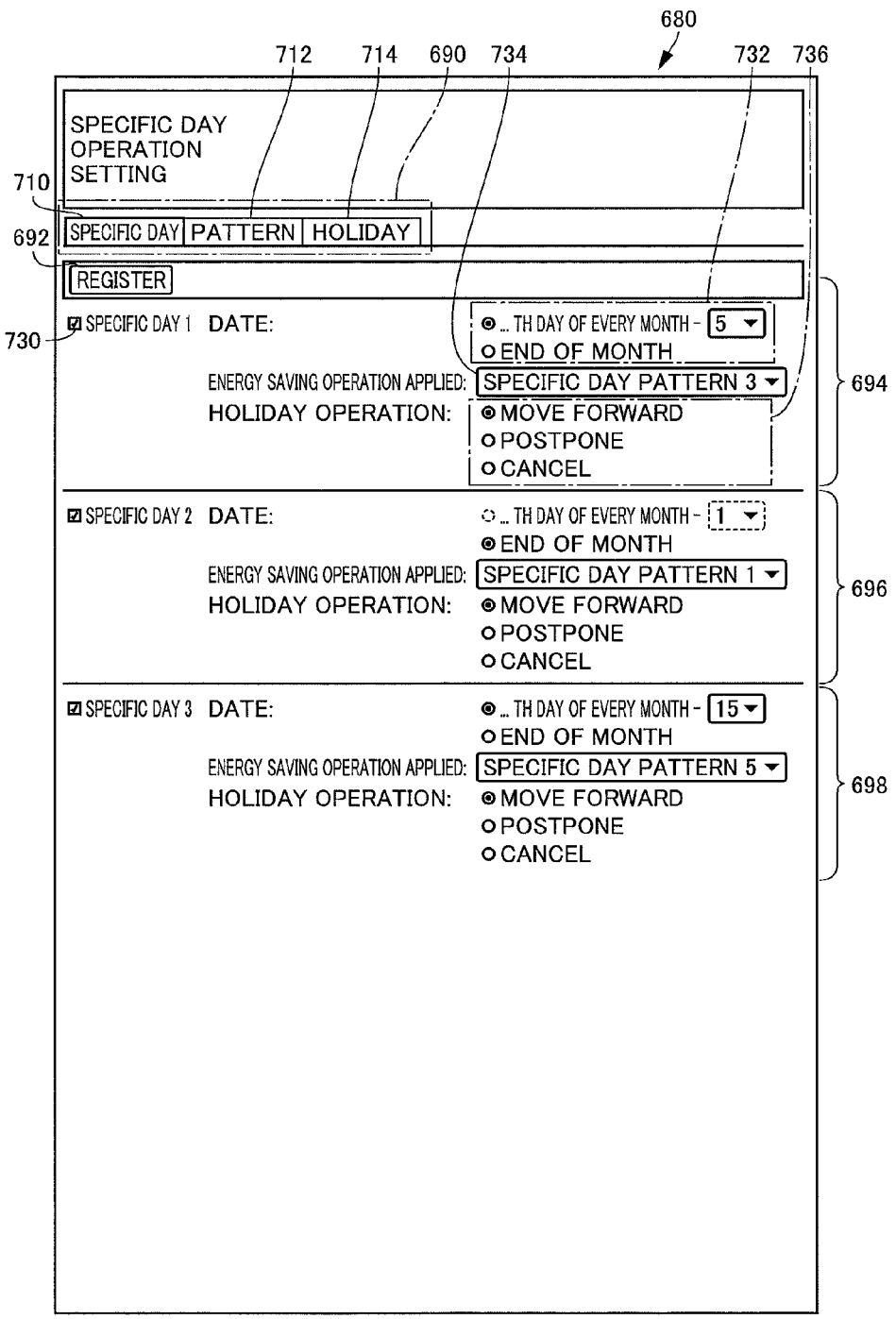

FIG. 11

| | | 712 714 | 860 882 | | 830 |
|---|---|---|---|---|---|
| 710 | SPECIFIC DAY OPERATION SETTING | | | | |
| 840 | SPECIFIC DAY | PATTERN | HOLIDAY | | |
| | LIST OF HOLIDAYS | | | | |
| | SELECT DAY OF THE WEEK | | | | |
| | EVERY WEEK: ☐MON ☐TUE ☐WED ☐THU ☐FRI ☐SAT ☐SUN | | | | 842 |
| 862 | | | | | |
| | REGISTER | | | | |
| 880 | DESIGNATE PERIOD | | | | |
| | FROM/TO: 2011/04-2011/06 ▼ | | | | |
| | LAST REGISTERED AT: 2011/06/08 11:37:35 | | | | |

884 — calendar table with columns APRIL, MAY, JUNE and rows 01–31 with checkboxes

844

SELECT ALL | CLEAR

REGISTER 890  886  888

IMAGE FORMING APPARATUS HAVING ENERGY SAVING MODE LEARNING FUNCTION AND CONTROLLER THEREFOR

CROSS-REFERENCE TO RELATED APPLICATION

This application is a Continuation of copending application Ser. No. 13/682,813, filed on Nov. 21, 2012, which claims priority under 35 U.S.C. §119(a) on Patent Application No. 2011-260001 filed in Japan on Nov. 29, 2011, all of which are hereby expressly incorporated by reference into the present application.

BACKGROUND OF THE INVENTION

Field of the Invention

The present invention relates to an image forming apparatus with an operational mode allowing a so-called power-saving operation as well as to a controller for controlling the power-saving operation of the image forming apparatus. More specifically, the present invention relates to an image forming apparatus having a function of controlling time from completion of a work before a power saving mode is entered, and a controller therefore.

Description of the Background Art

As one type of image processing apparatuses as electronic equipment, an image forming apparatus for forming an image on a sheet of paper (typically a copy machine) has been introduced to many places of business (companies and offices). In such a place of business, it is becoming a common practice to have an image forming apparatus having a printer function or copy function connected to a network and to share the apparatus by a plurality of users. An MFP (MultiFunction Peripheral) as one type of such image forming apparatus has a plurality of basic operational modes including copy mode, facsimile mode, network-compatible printer mode and scanner mode. In such an image forming apparatus, each user sets an operational mode and sets a function such as double-sided printing or collective printing (2-in-1 of printing two pages on one sheet, or 4-in-1 of printing four pages on one sheet), and thereby forms an image on recording paper in a desired manner. Appropriate combinations of these functions are used increasingly these days.

Let us consider a digital image forming apparatus provided with an image forming unit utilizing electrophotography process. In such an image forming apparatus, a toner image reproduced on a photoreceptor is transferred to a sheet of recording paper. A heating and fixing unit has a heat source such as a heater, and fixes the toner that has been transferred to the sheet of recording paper on the sheet, with prescribed temperature and pressure. Therefore, in order to provide an environment allowing image formation at any time, it is necessary to keep the heating and fixing unit at a constant temperature. This means that power conduction to the heater must be controlled continuously. Such a control naturally leads to a problem of increased power consumption. Particularly, a heater needs much electric power and, therefore, it poses a significant problem from the viewpoint of energy saving. Reduction of power consumption in companies and offices is emphasized recently and, therefore, constant need of such big electric power is undesirable.

In view of the foregoing, it may be possible to control power conduction to the heating and fixing unit taking into account operational status of the image forming apparatus while it is powered on. If power conduction to the heating and fixing unit is reduced too much, however, there arises a problem that image formation cannot be started immediately even when power conduction to the heating and fixing unit is resumed for image formation. This is because the temperature of heating and fixing unit has been reduced. An image cannot be formed before the heating and fixing unit attains to a prescribed temperature, and the user is kept waiting. Therefore, it is not preferable to shut-off power conduction to the heating and fixing unit too early after the end of operation of the image forming apparatus.

On the other hand, depending on the time of day or time slot, the apparatus may be used very frequently or may be left idle and kept in a standby state for a long time. If the operational status of the image forming apparatus is monitored carefully and the time before power conduction to the heating and fixing unit is shut-off is determined appropriately, power consumption may possibly be further reduced.

As a solution to such a problem, Japanese Patent Laying-Open No. 2007-30325 (hereinafter referred to as '325 Reference) discloses a printing device in which data is accumulated by obtaining number of printings per each time slot while the device is powered-on, and transition time to the power saving mode is determined based on the number of printings of each time slot included in the accumulated data.

FIG. 1 shows an example of wait time per hour of the image forming apparatus, and FIG. 2 shows an example of change in the number of outputs and the number of jobs per hour. As shown in FIGS. 1 and 2, the wait time, the number of outputs and the number of jobs per hour have prescribed patterns. Such patterns, however, may vary department by department, or may vary seasonally. The patterns may also vary dependent on the day of the week.

The printing device disclosed in '325 Reference learns the transition time to the power saving mode based on the history of printing, and the printing device is controlled such that the time before suspension is made shorter in the time slot when the number of printing is small, and the time before suspension is made longer in the time slot when printing is done relatively frequently. Such a control reduces the possibility that the printing device is in the suspended state and that it takes long before an image is formed, when use of the printing device is started.

Here, it is noted that depending on the place where the image forming apparatus is installed, the day and the time of day (time slot) when the business peaks is known in advance. If the transition time to the power saving mode is set short in the day and the time of day when the business peaks, business efficiency lowers. Therefore, it is preferred that the transition time to the power saving mode is manually settable, to prevent the transition time to the power saving mode from being set too short in such a specific day (hereinafter also referred to as a specific day) and specific time of day (hereinafter also referred to as a specific time slot).

For instance, Japanese Patent Laying-Open No. 2005-71269 (hereinafter referred to as '269 Reference) discloses an image processing system in which the power saving mode of a specific day and specific time slot can be set manually based on calendar data. It is possible to activate the learning function as described in '325 Reference and to manually set the "specific day and specific time slot" as disclosed in '269 Reference to cause the apparatus in a specific power saving setting (transition time to the power saving mode) in the specific day and the specific time slot, so as to cope with the peak business day of each month and thereby to prevent decrease in business efficiency.

If the operation patterns of an image forming apparatus are well understood by the user, it may be possible to combine the manual setting with learning, as described in '269 Reference, to reflect the operational status of the image forming apparatus. In that case, however, if the relation between manual setting and learning is not successfully established, learning accuracy possibly degrades. Such a problem is not described in '269 Reference. The manual setting itself is not necessarily easy if the actual situation is to be accurately reflected. If the manual setting is not very accurate, energy saving effect cannot be attained. If accuracy of manual setting is to be increased, it becomes necessary to accurately grasp the operational status of the image forming apparatus, and the burden on a person in charge becomes heavier.

SUMMARY OF THE INVENTION

Therefore, an object of the present invention is to provide an image forming apparatus allowing efficient management of an energy saving operation pattern by combining learning and manual setting, as well as a controller for controlling the energy saving operation pattern of the image forming apparatus.

It is more preferable to provide an image forming apparatus allowing efficient management of the energy saving operation pattern by combining learning and manual setting, alleviating burden on the person in charge at the time of manual setting and preventing decrease in accuracy, as well as a controller for controlling the energy saving operation pattern of the image forming apparatus.

According to a first aspect, the present invention provides an image forming apparatus, capable of changing state of conduction, after a lapse of a preset transition time without any prescribed operation made in a normal state, from the normal state to a power saving state of smaller power consumption. The image forming apparatus includes: a storage device configured to store specific time slot information for distinguishing a normal operation time slot and a specific time slot; a determining device configured to determine the transition time in the normal operation time slot, based on operational status of the normal operation time slot in the past of the image forming apparatus; a setting receiving device configured to receive and store setting of the transition time in the specific time slot; and a switching device, configured to switch the state of conduction of the image forming apparatus, using the transition time determined by the determining device and the transition time stored in the setting receiving device, in the normal operation time slot and in the specific time slot, respectively, based on the specific time slot information stored in the storage device.

The determining device determines the transition time in a normal operation time slot, based on the operational status of the image forming apparatus in the normal operation time slot in the past. On the other hand, the setting receiving device receives setting by an operator of the transition time in the specific time slot. In the normal operation time slot, the switching device switches the state of power conduction of the image forming apparatus between the normal state and the power saving state using the transition time determined by the determining device. On the contrary, in the specific time zone, the switching device switches the state of power conduction of the image forming apparatus using the transition time of which setting is received by the setting receiving device.

In determining the transition time in the normal operation time slot, the operational status of the image forming apparatus in the normal operation time slot is used, rather than the operational status of the image forming apparatus in the specific time slot. Therefore, influence of the operational status of the image forming apparatus in the specific time slot on the transition time in the normal operation time slot can be prevented. As a result, an image forming apparatus allowing efficient management of the energy saving operation pattern by combining learning and manual setting can be provided.

Preferably, the setting receiving device includes: a default transition time generating device configured to generate and present to an operator a default value of the transition time of the specific time slot, by collecting, when setting of the transition time in the specific time slot is received, information of operational status of the image forming apparatus in each specific time slot; and a modification receiving device configured to receive modification by the operator to the default value, and to store the default value thus modified as the setting of the transition time in the specific time slot.

The default value of transition time in the specific time slot is generated by the setting receiving device, by collecting the operational status of the image forming apparatus. The operator can set the desired transition time based on the actual operational status of the image forming apparatus in the specific time slot, using the default value as a reference and modifying it as needed by the modification receiving device. This prevents excessive burden on the person in charge of setting.

More preferably, the image forming apparatus further includes: a holiday obtaining device configured to obtain setting of a holiday of a place of business where the image forming apparatus is installed; and a changing device configured to change, if the specific time slot set by the setting receiving device falls on the holiday obtained by the holiday obtaining device, the specific time slot to a different time slot having a prescribed relation with the specific time slot.

If the specific time slot falls on a holiday, the setting of transition time of the image forming apparatus would possibly be different from the setting actually needed in the place of business, unless the specific time slot is changed to a different time slot. Since the changing device is provided, it becomes possible to determine in advance how the specific time slot is to be changed if it falls on a holiday. Thus, determination of the transition time of the image forming apparatus can be changed to reflect the actual situation of the place of business where the image forming apparatus is installed.

More preferably, the image forming apparatus further includes a data communication device. The holiday obtaining device includes a holiday setting receiving device configured to receive setting of a holiday of the place of business where the image forming apparatus is installed, from a prescribed external device through the communication device.

Assume that a company has a plurality of places of business, and holidays are the same for all the places of business. In that case, holiday management place by place of business is inefficient. When settings related to the holidays are stored in an external device and each image forming apparatus receives the settings from the external device, holidays of the plurality of places of business can collectively be managed with high efficiency.

In accordance with a second aspect, the present invention provides a controller for controlling state of conduction of an image forming apparatus, capable of changing state of conduction, after a lapse of a preset transition time without any prescribed operation made in a normal state, from the normal state to a power saving state of smaller power consumption, the controller including: a storage device configured to store specific time slot information for distinguishing a normal operation time slot and a specific time slot; a determining device configured to determine the transition time in the normal operation time slot, based on operational status of the normal operation time slot in the past of the image forming apparatus; a setting receiving device configured to receive and store setting of the transition time in the specific time slot; and a switching device, configured to switch the state of conduction of the image forming apparatus, using the transition time determined by the determining device and the transition time stored in the setting receiving device, in the normal operation time slot and in the specific time slot, respectively, based on the specific time slot information stored in the storage device.

In accordance with a third aspect, the present invention provides a method of controlling power saving state in an image forming apparatus, capable of changing state of conduction, after a lapse of a preset transition time without any prescribed operation made in a normal state, from the normal state to a power saving state of smaller power consumption. The method includes the steps of: storing, in a first storage device, specific time slot information for distinguishing a normal operation time slot and a specific time slot; determining the transition time in the normal operation time slot, based on operational status of the normal operation time slot in the past of the image forming apparatus; receiving and storing in a second storage device setting of the transition time in the specific time slot; and switching the state of conduction of the image forming apparatus, using the transition time determined at the determining step and the transition time stored in the second storage device, in the normal operation time slot and in the specific time slot, respectively, based on the specific time slot information stored in the first storage device.

As described above, by the present invention, an image forming apparatus allowing efficient management of the energy saving operation pattern by combining learning and manual setting, and attaining accurate result of learning, as well as a controller for controlling the energy saving operation pattern of the image forming apparatus can be provided.

Further, by the present invention, an image forming apparatus allowing efficient management of the energy saving operation pattern by combining learning and manual setting, alleviating the burden on the person in charge at the time of setting, and preventing decrease in accuracy, as well as a controller for controlling the energy saving operation pattern of the image forming apparatus can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows an example of job logs recorded in the image forming apparatus of FIG. 4.

FIG. 8 shows an example of an energy saving setting screen used in the image forming apparatus shown in FIG. 4.

FIG. 9 shows an example of a panel used for setting a specific day on a screen allowing energy saving setting of the specific day.

FIG. 11 shows an example of a panel used for setting a holiday on the screen allowing energy saving setting of the specific day.

DESCRIPTION OF THE PREFERRED EMBODIMENTS

Figure 1:
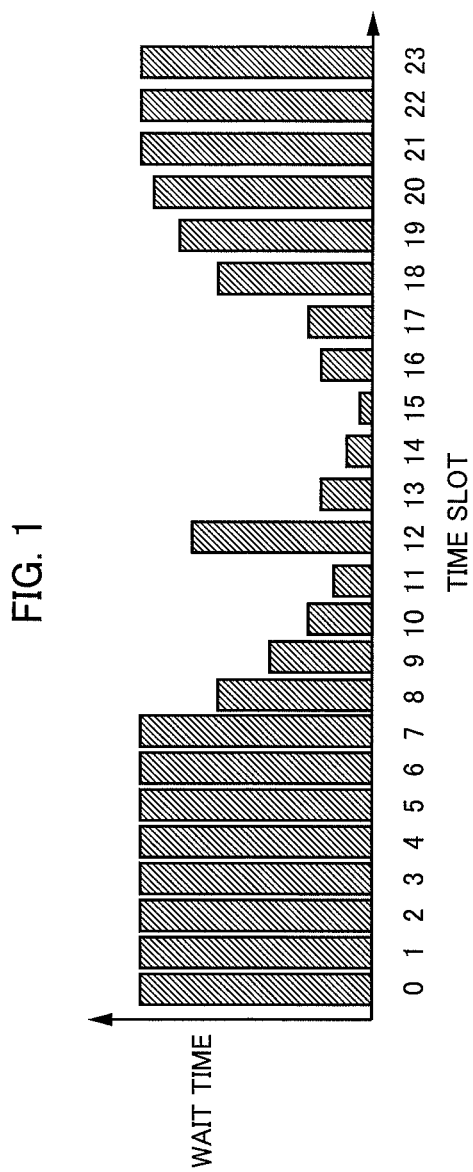
FIG. 1 is a graph showing an example of hourly wait time of an image forming apparatus.

In the following description, the same components are denoted by the same reference characters. Their functions and names are also the same. Therefore, detailed description thereof will not be repeated.

[First Embodiment]

<<Outline>>

Figure 2:
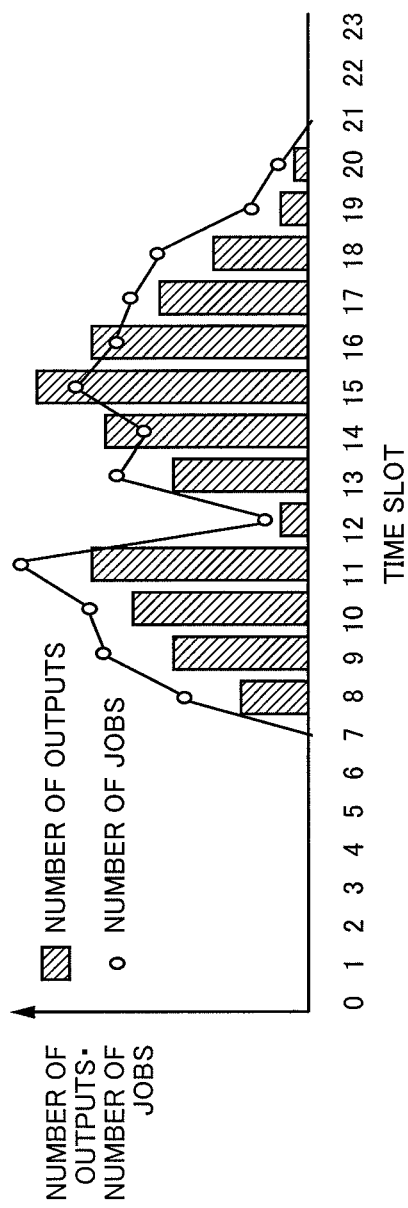
FIG. 2 is a graph showing hourly variation in the number of outputs per hour and the number of jobs per hour.

As described with reference to FIGS. 1 and 2, operational status of the image forming apparatus of the system in accordance with the present embodiment differs department by department, day by day of the week, and hour by hour of the day. Therefore, the time before the heating and fixing unit is set to the suspended state also differs day by day of the week, hour by hour of the day and department by department where the image forming apparatus is installed. Therefore, the image forming apparatus in accordance with the present embodiment learns energy saving operation pattern automatically, from the operational status of each time of day (time slot) and each day of the week, as in '269 Reference. In order to solve the problem that it is difficult for the user to grasp how the apparatus operates, the image forming apparatus in accordance with the present embodiment provides a user-friendly display showing the result of learning in the form of a table, as represented by Table 50 of FIG. 3.

Figure 3:
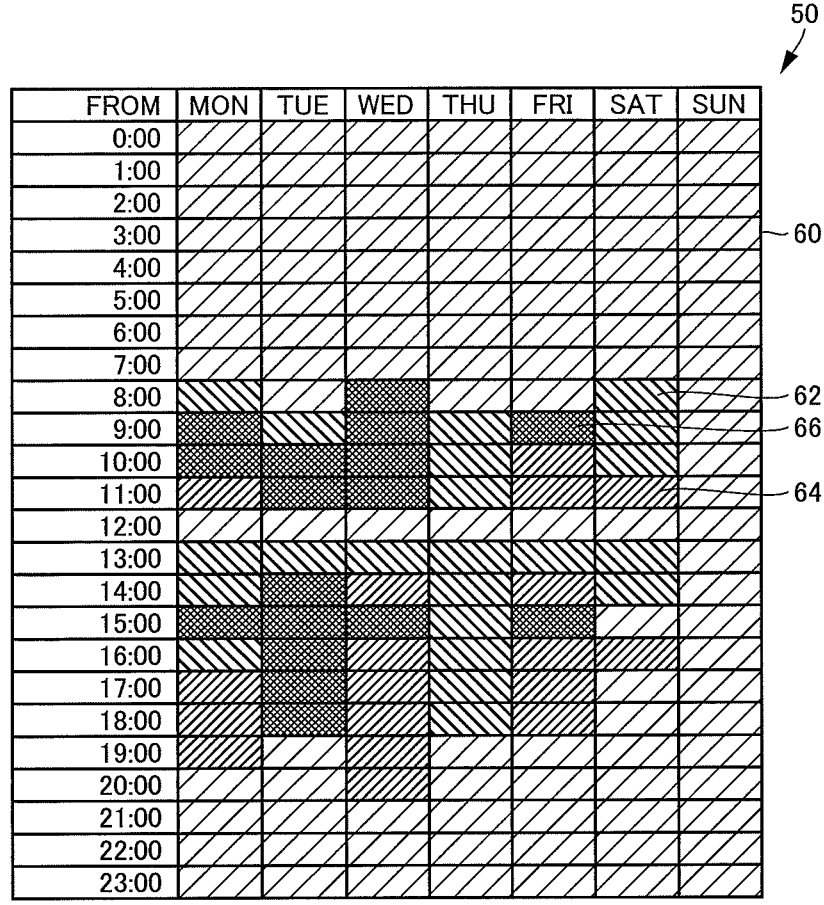
FIG. 3 is a functional block diagram schematically showing an example of a visually-friendly display of operational modes of the image forming apparatus in the image forming system in accordance with an embodiment of the present invention.

Referring to FIG. 3, Table 50 is a two-dimensional table. In Table 50, the abscissa represents days of the week and the ordinate represents hours of the day, that is, 24 hours divided hour by hour.

In the image forming apparatus of the system in accordance with the present embodiment, each cell of Table 50 represents the energy saving operation pattern set for that time slot of that day, by the color of the cell. Since FIG. 3 here is given in black-and-white, the colors are represented by different hatchings. By way of example, cell 66 is in a "high-performance" mode in which the apparatus is used with highest frequency, and it corresponds to red in actual display. Cell 64 is in a "performance" mode, in which image forming apparatus 100 is used with relatively high frequency, though not as high as in the "high performance" mode, and this corresponds to pink in actual display. Cell 62 represents a time slot of "balance" mode, in which the frequency of use is lower than the time slot of "performance" mode, and it corresponds to pale blue. Cell 60 represents a time slot of "energy saving" mode having lowest frequency of use, and it corresponds to green. Since the cells are displayed in different colors, the four energy saving operation patterns can clearly be understood visually. No matter whether Table 50 is displayed on a touch-panel display 130 of image forming apparatus 100 or on a display of a personal computer (hereinafter referred to as a PC) 190 for an administrator, the administrator can easily and intuitively understand how image forming apparatus 100 is operating in each time slot.

If the energy saving operation pattern is "high performance," the time from when the heating and fixing unit of the image forming apparatus stops operation until the apparatus makes a transition to a suspended state (hereinafter this time will be referred to as "transition time") is the longest and, for example, it is one hour. If the pattern is "performance," the transition time is the second longest, and it is set, for example, to 30 minutes. If the pattern is "balance," the image forming apparatus is shut-off in a much shorter time period than in the "performance" mode, for example, after 5 minutes. If the pattern is "power saving," the image forming apparatus is shut-off in the shortest time period after the end of operation, for example just after 10 seconds.

Image forming apparatus 100 in accordance with the present embodiment has a function of automatically learning such energy saving operation patterns based on past job logs. Further, in order to enable the user to manually set an energy saving operation pattern for a specific day different from the days of which energy saving operation patterns are determined based on learning, image forming apparatus 100 has a function allowing manual setting of such a specific day and the energy saving operation pattern of image forming apparatus 100 for the specific day. Here, the energy saving operation pattern can be set manually time-slot by time-slot. The settable mode is any of the four modes mentioned above. It is also possible to set using the result of learning. During learning described above, the time slot or time slots of which operational mode is set manually (hereinafter such a time slot will be referred to as "specific time slot") of the specific day set in this manner are not used as the object of learning, and in learning the energy saving operation patterns of other days, the job logs of the specific time slot of the specific day are not user for learning.

Details of these functions and the configurations to realize such functions in the image forming apparatus of the system in accordance with the present embodiment will be described later.

<<Configuration>>

The image forming apparatus forms an image on a sheet of recording paper by electrophotography. The image forming apparatus includes, as the operational modes, copy mode, facsimile mode, document filing mode and mail mode. The image forming apparatus may also have a network printer mode. The printing method is not limited to the electrophotography, and the present invention is applicable to any printing method involving a component such as the heating and fixing unit that takes relatively long time to return to the operable state once it is set to the suspended state.

<Image Forming Apparatus: Control Block Configuration>

Figure 4:
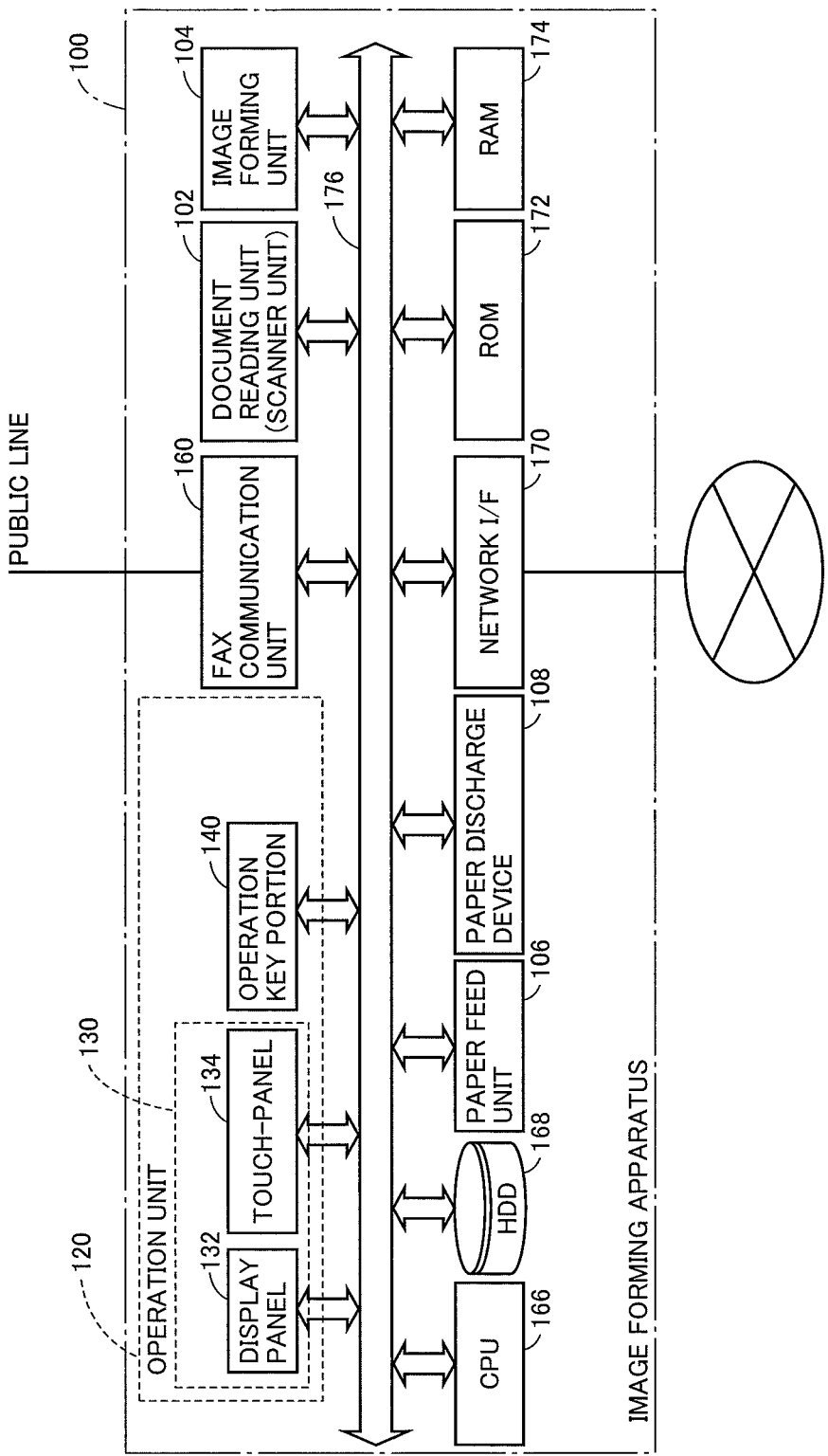
FIG. 4 is a functional block diagram showing hardware configuration of the image forming apparatus in the image forming system of FIG. 3.

Referring to FIG. 4, image forming apparatus 100 of the system in accordance with the present embodiment includes a document reading unit (scanner) 102, an image forming unit 104, a FAX communication unit 160, a network interface (hereinafter interface will be denoted as I/F) 170, and an operation unit 120, operating as a operation display panel allowing setting of functions related to various operational modes. Operation unit 120 includes a touch-panel display 130 and an operation key portion 140. Touch-panel display 130 includes a display panel 132 formed, for example of a liquid crystal panel, and a touch-panel 134 arranged over display panel 132 allowing detection of a position pressed by a user's finger. On operation key portion 140, a few function keys and ten keys are arranged.

Referring to FIG. 4, image forming apparatus 100 further includes a CPU (Central Processing Unit) 166, a read only memory (ROM) 172 for storing programs and the like, a hard disk 168 as a non-volatile storage capable of storing programs and data even when power is shut-off, and a random access memory (RAM) 174 for providing a memory area when a program is executed.

Image forming apparatus 100 further includes a bus 176 connected to document reading unit 102, image forming unit 104, FAX communication unit 160, network I/F 170, operation unit 120, CPU 166, ROM 172, hard disk 168 and RAM 174. CPU 166 loads a program stored in hard disk 168 or the like to RAM 174 and executes the program, and thereby controls various units and components of the image forming apparatus and realizes various functions for image formation.

Image forming apparatus 100 further includes a paper feed unit 106 communicable with various units and components of image forming apparatus 100 through bus 176, for executing paper feed control related to image forming unit 104 in accordance with a command from CPU 166, and a paper discharge device 108, also connected to bus 176, for controlling discharge of recording paper from image forming unit 104 in accordance with a command from CPU 166.

In hard disk 168, files of image data of documents scanned by image forming apparatus 100 are stored, folder by folder, with date of saving and name of the user who saved the data. Further, initial screen data of various operational modes are stored in hard disk 168.

ROM 172 stores programs and data necessary for controlling the operations of image forming apparatus 100. As data to be stored with programs in ROM 172, initial screen data of various operational modes may be stored. CPU 166 controls image forming apparatus 100 in accordance with the programs and data stored in ROM 172, and executes control related to various functions of image forming apparatus 100.

As shown in FIG. 4, FAX communication unit 160 of image forming apparatus 100 is connected to a public line, and network I/F 170 is connected to a network line. To the network line, a computer or the like that uses image forming apparatus 100 as a network compatible printer, or a computer or the like specified by an URL (Uniform Resource Locator) designated by the Internet may be connected. When connected to the Internet in this manner, image forming apparatus 100 can obtain necessary information through the Internet. As will be described later, the result of learning of energy saving operation patterns and the energy saving operation pattern of a specific day in image forming apparatus 100 can be confirmed, modified or added, through a computer for the administrator on the network, as will be described later.

RAM 174 provides a function as a working memory temporarily storing results of operations and processes by CPU 166, and a function as a frame memory for storing image data.

Document reading unit 102, image forming unit 104, touch-panel display 130 and operation key portion 140 implementing operation unit 120, paper discharge device 108, ROM 172, hard disk 168 and RAM 174 are controlled by CPU 166 executing a prescribed program or programs. Operation unit 120 communicates with CPU 166 through input/output I/F.

Operation unit 120 is a plate-shaped panel, provided tilted to be easily viewable by the user. On a surface of operation unit 120, touch-panel display 130 is provided on a left side area, and operation key portion 140 is provided on a right side area. Touch-panel display 130 and operation key portion 140 are formed such that operation unit 120 as a whole is provided as an integrated piece.

<Learning of Energy Saving Operation Patterns>

In the following, the process for learning energy saving operation patterns of image forming apparatus 100 will be described. Image forming apparatus 100 has the following characteristics: it automatically learns energy saving operation patterns based on job logs; it displays the result of learning in a manner easily understandable by the user; it allows the user to set an energy saving operation pattern; it can display the set user mode together with the result of learning, in a manner easily understandable by the user; and it allows advance registration of a plurality of energy saving operation patterns that can be set by the user.

Figure 5:
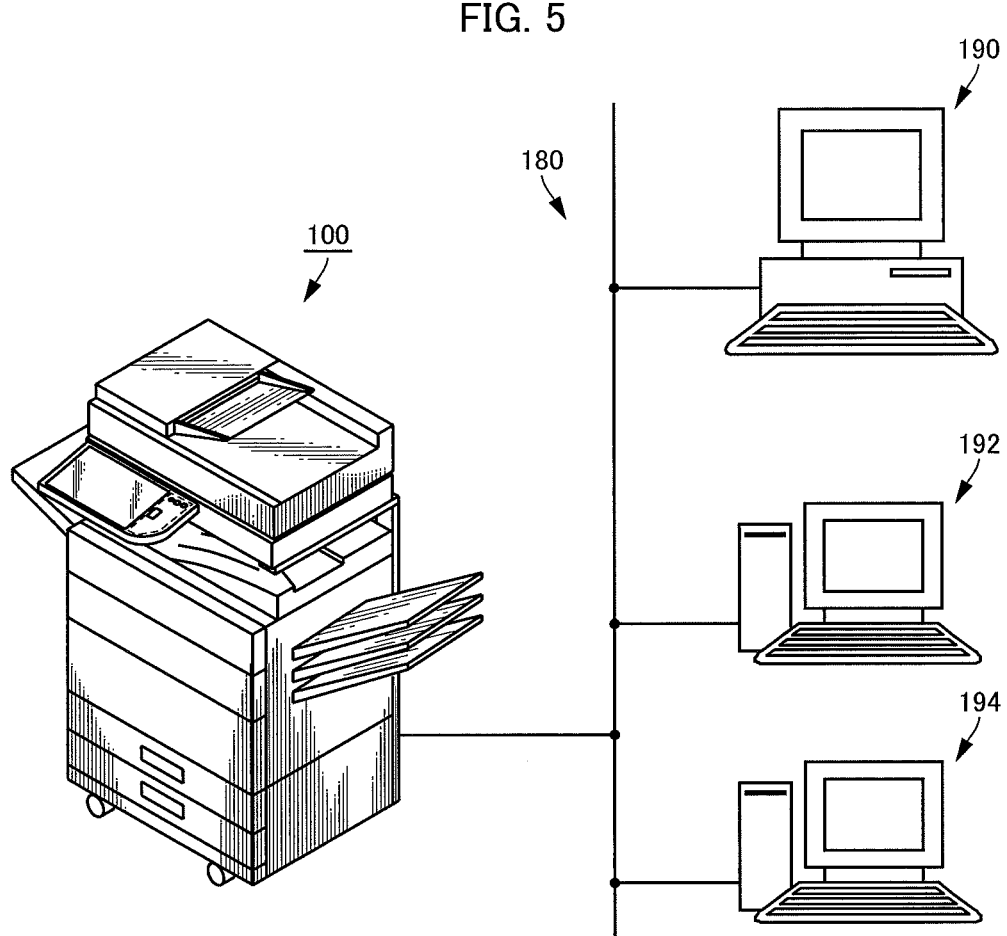
FIG. 5 schematically shows an example of a network system configuration including the image forming apparatus shown in FIG. 4.

Referring to FIG. 5, typically, image forming apparatus 100 communicates with a plurality of PCs 190, 192, 194 and the like through network system 180, and executes printing in accordance with a print request from these PCs, transmits a image scanned by image forming apparatus 100 to a specific server, or transmits the scanned image as a mail to a desired mail address. Here, details of items not related to the setting of energy saving operation patterns will not be described, for easier understanding.

Referring to FIG. 5, assume that PC 190 is for the administrator of image forming apparatus 100, and PCs 192 and 194 are for general users. The display and setting of energy saving operation patterns using Table 50 as described with reference to FIG. 3 may be executed on operation unit 120 of image forming apparatus 100, though it may be more convenient if the display and setting can be changed also from PC 190 for the administrator. Image processing apparatus 100 allows such a process.

Figure 6:
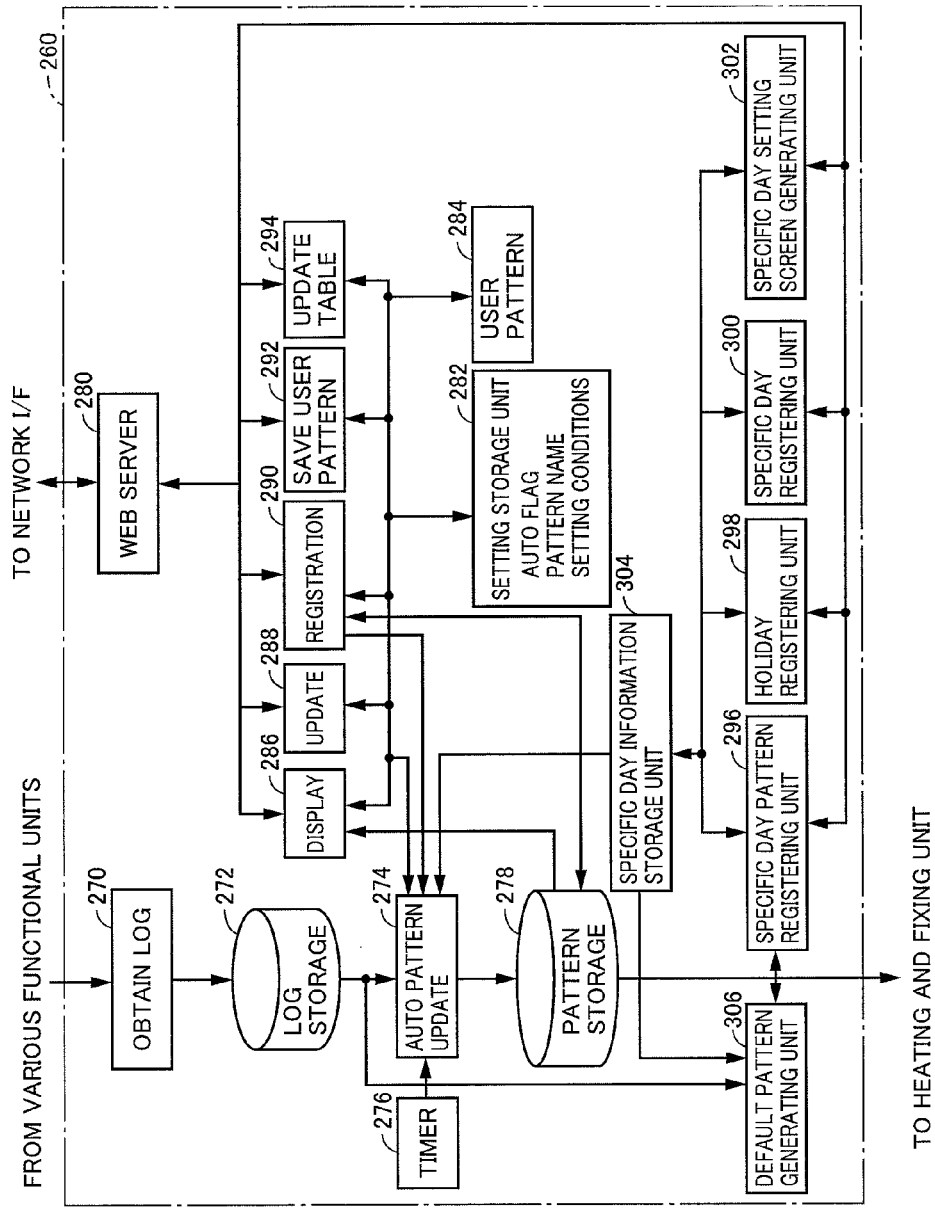
FIG. 6 is a functional block diagram showing functions related to an operational mode related to energy saving.

FIG. 6 shows, as an energy saving setting unit 260, only the functional portions related to the energy saving operational mode related to the energy saving setting, extracted from image forming apparatus 100. Referring to FIG. 6, energy saving setting unit 260 includes: a log obtaining unit 270 obtaining, as job logs, record of operations of each functional unit of image forming apparatus 100; a log storage unit 272 storing job logs obtained by log obtaining unit 270; an auto pattern updating unit 274 activated by an externally applied trigger, for automatically updating a schedule of energy saving operation pattern of image forming apparatus 100; a timer 276 for periodically (for example, at 0:00 every day) triggering the schedule updating process by auto pattern updating unit 274; and a pattern storage unit 278 storing the schedule pattern of energy saving operation pattern formed (updated) by auto pattern updating unit 274, and applying it to the heating and fixing unit and the like of image forming unit 104. Auto pattern updating unit 274 does not use job logs of a specific time slot of a specific day of each month designated by the user, when learning the energy saving patterns of respective days of the week. Since the job logs of a specific time slot of a specific day are excluded from the learning data for pattern update, influence of the operation pattern of the specific time slot on the energy saving operation patterns other than the specific time slot of specific day can be prevented.

The energy saving operation pattern in the image forming apparatus of the system in accordance with the present invention is represented in four stages, day by day of the week and time-slot by time-slot, as will be described below. These four stages are indicated by numerical values 1, 2, 3 and 4. The energy saving operation pattern includes seven records corresponding to the days of the week. Each record consists of a name (identifier) of the energy saving operation pattern to which the record belongs, a value representing the day of the week, and a set of values indicating the energy saving operation pattern slot by slot. Consider, for example, an example of Monday shown in FIG. 3. The portions representing the time-slot by time-slot energy saving operation pattern of the record are "1, 1, 1, 1, 1, 1, 1, 1, 2, 4, 4, 3, 1, 2, 2, 4, 2, 3, 3, 3, 1, 1, 1, 1." If the energy saving operation pattern is not yet established, such as at the time of shipment of the apparatus, the value representing the energy saving operation pattern assumes zero.

In the embodiment described in the following, a method in which operating days of the image forming apparatus are classified to seven first groups on weekly basis and the energy saving operation pattern of each group is learned, and a method in which operating days of the image forming apparatus are classified to 31 second groups based only on the date of year, month and date, and by designating a specific group (that is, specific date), and the energy saving operation pattern is designated manually, are both used. These methods of classification are examples only, and other methods of classification are also possible. By way of example, at a place of business working in cycles of ten days, it is reasonable to have ten first groups. At a place of business working in bi-weekly cycles, it is reasonable to have fourteen first groups. As to the second group, at a place of business in which specific work is done every half year, for example, it is desirable to classify the operating days to 6×31=186 groups. It is noted, however, that the most common method is to classify the first group based on the days of the week and the second group based only on the date.

Log storage unit 272, pattern storage unit 278 and the like are realized by hard disk 168 shown in FIG. 4.

Energy saving setting unit 260 further includes a web server 280 connected to network I/F 170. Web server 280 operates in image forming apparatus 100, to allow settings related to various functions of image forming apparatus 100 on a browser base from an external PC. Web server 280 has a function of allocating processes related to various external requests to appropriate programs or processing units in accordance with parameters associated with each request, and returning a web document as a result of processing to a browser. Here, for simplicity of description, of the functional blocks processing external requests through web server 280, those not related to settings of energy saving operation patterns are not shown.

Energy saving setting unit 260 further includes: a display processing unit 286, responsive to an external request received through web server 280, for reading an energy saving operation pattern schedule currently set in image forming apparatus 100 from pattern storage unit 278, and forming and returning a web document for visually displaying the schedule; an update processing unit 288 receiving a request for changing contents of the schedule displayed on an external PC through web server 280, for forming and returning a web document for visually displaying the schedule of energy saving operation patterns determined in accordance with the request; and a registration processing unit 290, responsive to an external request for setting a pattern of energy saving operation schedule of image forming apparatus 100 received through web server 280, for writing the set pattern to pattern storage unit 278.

Energy saving setting unit 260 further includes: a user pattern saving unit 292, processing a request by the user to form a pattern of energy saving operation schedule using an external PC through web server 280, and if saving of the pattern formed by the user is designated, saving the pattern in a computer readable format; a table update processing unit 294, when a user is forming a pattern of an energy saving operation schedule on an external PC, through web server 280, for forming and returning a web document for rewriting display of the energy saving operation schedule on the external PC in accordance with a user input; a user pattern storage unit 284 for storing the user patterns saved by user pattern saving unit 292 with a pattern name of each user pattern; and a setting storage unit 282 for storing settings related to the energy saving operation patterns of image forming apparatus 100, including an auto flag indicating whether or not image forming apparatus 100 is in an operational mode of automatically learning the energy saving operation pattern, a pattern name if the current energy saving operation pattern schedule is a user pattern, and what process is to be done if no job log exists for some time slots. Setting storage unit 282 can be looked up from various units of energy saving setting unit 260, and each functional block operates based on setting information stored in setting storage unit 282. The information stored in setting storage unit 282 includes a method of calculating rate of operation used for determining the transition time, and a rule for determining how the energy saving pattern is to be determined based on the rate of operation.

Table 1 below shows a method of calculating the rate of operation of image forming apparatus of the system in accordance with the present embodiment. Table 2 shows the calculated rate of operation, the name of energy saving pattern adopted in accordance with the rate of operation, and the operation (transition time and the state after transition) corresponding to each energy saving pattern.

TABLE 1

| Rate of operation | Outputs/hour | Job number/hour | Wait time/hour |
|---|---|---|---|
| High | 300 or more | 24 or more | Shorter than 10 min. |
| Relatively high | At least 50 and smaller than 300 | At least 12 and smaller than 24 | At least 10 and shorter than 30 min. |
| Middle | At least 10 and smaller than 50 | At least 6 and smaller than 12 | At least 30 and shorter than 50 min. |
| Low | Smaller than 10 | Smaller than 6 | At least 50 min. |

TABLE 2

| Pattern name | Operation | Rate of operation |
|---|---|---|
| High performance | Suspend after 1 hour | High |
| Performance | Suspend after 30 min. | Relatively high |
| Balance | Shut-off after 5 min. | Middle |
| Power saving | Shut-off in shortest time after job end | Low |

The auto flag represents the auto mode if it is 1 and manual mode if it is 0. It is desirable that 1 is set as a default value of the auto flag. The reason for this is that after the apparatus is installed actually until the administrator becomes able to grasp the operational status, automatic learning of the energy saving operation patterns is desirable.

Energy saving setting unit 260 further has: a function of allowing the user to set a specific day; a function allowing a user to set an energy saving operation pattern of the specific day (hereinafter referred to as the "specific day pattern"), a function allowing the user to set a holiday; a function of forming a default pattern for the specific day pattern; and a function of learning, when weekly energy saving operation patterns are to be learned from logs, excluding the logs of the day registered as the specific day from the data for learning.

Figure 10:
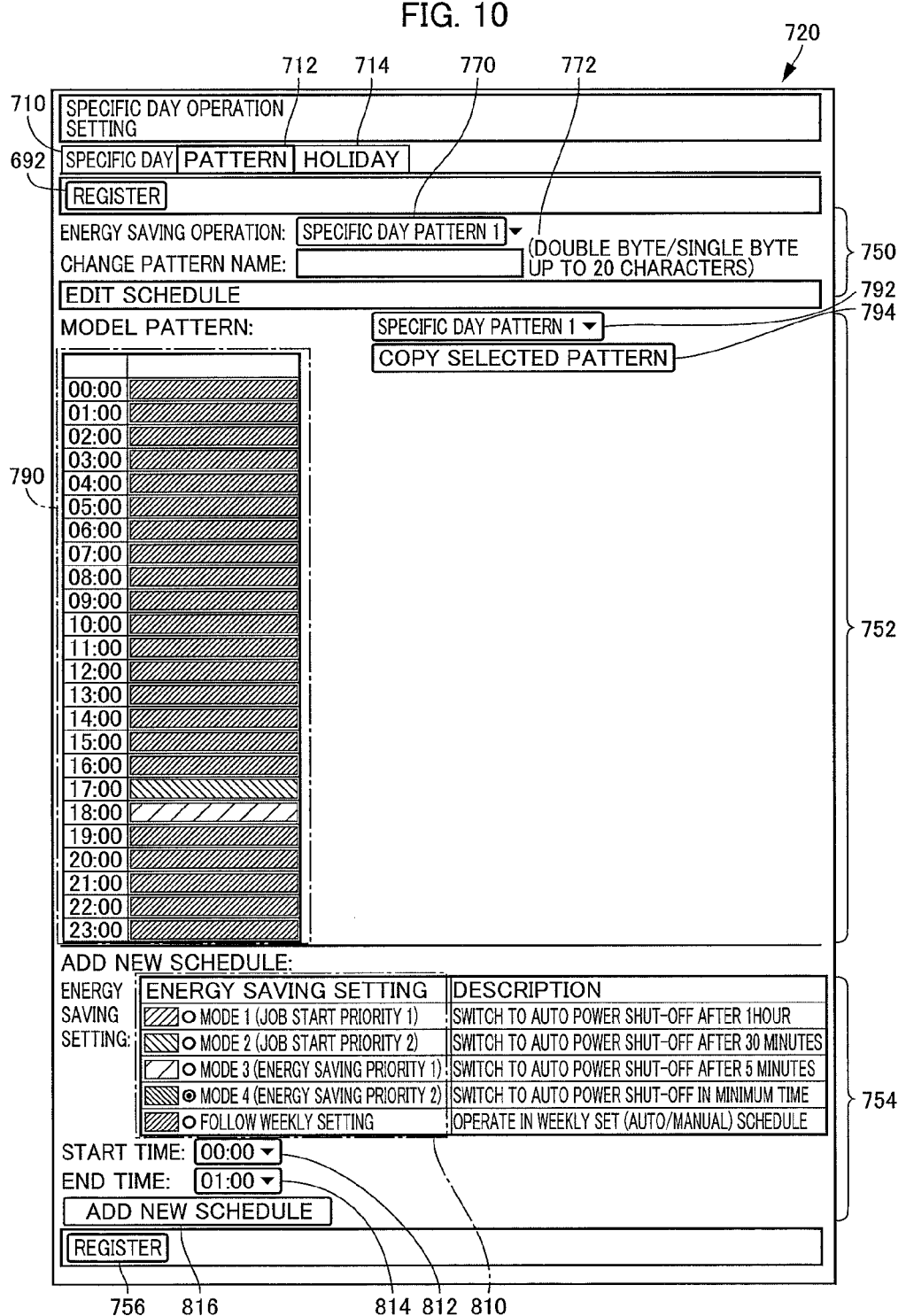
FIG. 10 shows an example of a panel used for setting an energy saving operation pattern of a specific day, on the screen allowing energy saving setting of the specific day.

Specifically, energy saving setting unit 260 further includes: a specific day setting screen generating unit 302 for generating a setting screen (FIGS. 9 to 11) for setting the specific day; a specific day registering unit 300 for registering a specific day through interaction with the user using a specific day registration screen 680 shown in FIG. 9; a holiday registering unit 298 for registering a holiday using a holiday registration screen 830 shown in FIG. 11; and a specific day pattern registering unit 296 for registering a specific day pattern determining an energy saving operation for the specific day using a specific day pattern registration screen 720 shown in FIG. 10. These processes are selectively executed based on form data received by web server 280, under the control of web server 280. Each processing unit executes the designated process and, thereafter, transmits a screen representing the process result to a web browser of the counterpart terminal, to be displayed thereon. The screens output by specific day registering unit 300, holiday registering unit 298, and specific day pattern registering unit 296 are specific day registration screen 680, holiday registration screen 830 and specific day pattern registration screen 720 shown in FIGS. 9, 11 and 10, respectively.

Energy saving setting unit 260 further includes: a specific day information storage unit 304, connected to specific day pattern registering unit 296, holiday registering unit 298, specific day registering unit 300 and specific day setting screen generating unit 302, for storing the specific day pattern information, holiday information and specific day information, set by using specific day pattern registering unit 296, holiday registering unit 298 and specific day registering unit 300; and a default pattern generating unit 306, responsive to reception of a request for generating a default pattern of the specific day from specific day pattern registering unit 296, based on the job logs stored in log storage unit 272 and specific day information stored in specific day information storage unit 304, for reading logs of the day corresponding to the specific day of last month, generating a default energy saving operation pattern for the specific day and returning it to specific day pattern registering unit 296.

Referring to FIG. 7, job log 320 stored in log storage unit 272 generally records, job by job, a job ID (identifier), a job mode, name of the computer which entered the job and its user name, log-in name of the user, start date and time and end date and time when image forming apparatus 100 started and ended the job, day of the week when the job was started, and the number of sheets printed by the job. The function of collecting such job logs 320 is provided as a standard function in recent general image forming apparatuses, not only in image forming apparatus 100. Such job logs may be used to find the cause of malfunction of the image forming apparatus in case the apparatus fails, by confirming the past operations, to study which functions are to be enhanced at the next replacement by confirming job types, or to monitor which user uses the image forming apparatus at what frequency and consumes how much paper. In the system in accordance with the present embodiment, job logs 320 as such are used for learning the energy saving operation patterns.

FIG. 8 shows the energy saving setting screen for setting the energy saving operation pattern in image forming apparatus 100 in accordance with the present embodiment. Referring to FIG. 8, the energy saving setting screen includes: a registration button 350, an update button 352, a mode selection radio buttons 354 and a pull-down menu 356 for setting the user pattern name, displayed at a header portion, and an energy saving operation pattern table 358 for visually displaying the energy saving operation pattern currently set in image forming apparatus 100 in the similar manner as the example of FIG. 3, displayed at the central portion.

At a tail portion of the screen, a check box 360 allowing the user to set whether a user pattern edition is to be done, a pull-down menu 362 for selecting the energy saving mode, a pull-down menu 364 for selecting a day of the week, a start time pull-down menu 366 and an end time pull-down menu 368 for designating the time slot as the object of setting, which are activated if check box 360 is checked, and a table update button 370 for outputting an instruction to update display of energy saving operation pattern table 358 in accordance with conditions designated by these components, are displayed. Further below these components, a pattern name field 372 for the user to input a pattern name when the user pattern is to be saved, a save button 374 used for instructing saving of the user pattern, a registration button 380 and update button 382 are displayed.

At upper and lower portions of the screen shown in FIG. 8, buttons 660 and 662 are arranged, for calling a screen (specific day operation setting screen) allowing registration of information related to settings of operations of image forming apparatus 100 on a specific day. The specific day information registration screen includes specific day registration screen 680 shown in FIG. 9, specific day pattern registration screen 720 shown in FIG. 10 and holiday registration screen 830 shown in FIG. 11.

Referring to FIG. 9, specific day registration screen 680 includes: a tab area 690 on which tabs allowing switching among panels of specific day registration screen 680, specific day pattern registration screen 720 and holiday registration screen 830 are displayed; a registration button 692 for instructing registration of the input specific day information in specific day information storage unit 304 (FIG. 6) in image forming apparatus 100; and first, second and third specific day information designating areas 694, 696 and 698, for registering up to three specific days.

Tab area 690 includes: a specific day tab 710 for displaying specific day registration screen 680; a pattern tab 712 for displaying specific day pattern registration screen 720; and a holiday tab 714 for displaying holiday registration screen 830.

The first, second and third specific day information designating areas 694, 696 and 698 all have the same configuration. Therefore, first specific day information designating area 694 will be described as a representative, in the following.

The first specific day information designating area 694 includes: a check box 730 for designating whether or not a first specific day is to be registered; a specific day setting area 732 for entering information specifying the specific day; a pull-down menu 734 for selecting an operation pattern (specific day pattern) of image forming apparatus 100 for the specific day from a number of predetermined specific day patterns and a default pattern (a pattern automatically set by image forming apparatus 100), which will be described later; and a holiday operation designating area 736 for designating whether the specific day is to be moved forward, to be postponed, or to cancel holiday operation, if the specific day falls on a holiday.

Specific day setting area 732 includes: two radio buttons for selecting whether a specific day of every month is to be designated by the date itself or to be designated as end of month; and a pull-down menu for selecting the date, if it is to be designated by the date.

Holiday operation designating area 736 includes three radio buttons for selecting whether the designation of the specific day is to be moved forward, postponed, or cancelled, if the specific day falls on a holiday.

Referring to FIG. 10, specific day pattern registration screen 720 includes, in addition to specific day tab 710, pattern tab 712, holiday tab 714 and registration button 692, a pattern identification area 750 for designating the number of the specific day pattern and the name of the specific day pattern, a pattern display area 752 for displaying the contents of set specific day pattern, and a schedule setting area 754 for designating, for each of time slots provided by dividing one day into 24 hours, which of five possible operational modes is to be applied, where the five possible operational modes include the pre-set four operational modes and the setting designated by the method of the system in accordance with the present embodiment for the week. At the lowermost portion of specific day pattern registration screen 720, a registration button 756 having the same function as registration button 692 is displayed.

Pattern identification area 750 includes a pull-down menu 770 for selecting first to fifth specific day patterns as the object of setting, and a text field 772 for entering the pattern name of the specific day pattern as the object of setting. In the present embodiment, the pattern name is limited to up to 20 single-byte or double-byte characters.

Pattern display area 752 includes: a schedule display area 790 displaying operational mode schedule, for 24 hours on hourly basis, of the specific day pattern as the object of setting; a pull-down menu 792 for designating a specific day pattern if any specific day pattern usable as a source for the specific day pattern as the object of setting exists; and a copy execution button 794 used by the user when the specific day pattern designated by pull-down menu 792 is to be copied as the specific day pattern of the object of setting. As will be described later, pull-down menu 792 displays not only the first to fifth specific day patterns but also the number of a default pattern automatically generated when a specific day is newly designated.

Schedule setting area 754 includes: a pull-down menu 812 for designating a start time of the time slot as the object; a pull-down menu 814 for designating an end time; and five radio buttons 810 for designating the energy saving operational mode to be set to the time slot designated by the pull-down menus 812 and 814. The operational modes that can be set by five radio buttons 810 include first and second job start priority modes, first and second energy saving priority modes and an operational mode in accordance with weekly setting.

In the first job start priority mode, if image forming apparatus 100 is left without any operation for one hour after image forming apparatus 100 was last used, the operational mode of image forming apparatus 100 is changed to auto power shut-off. In the second job start priority mode, if image forming apparatus 100 is left without any operation for 30 minutes after image forming apparatus 100 was last used (that is, in the absence of any event of operation), the operational mode of image forming apparatus 100 is changed to auto power shut-off. In the first power saving priority mode, if image forming apparatus 100 is left without any operation for five minutes after image forming apparatus 100 was last used, the operational mode of image forming apparatus 100 is changed to auto power shut-off. In the second power saving priority mode, when any operation on image forming apparatus 100 ends, the operational mode of image forming apparatus 100 is changed to auto power shut-off in shortest possible time period. In the operational mode in accordance with the weekly setting, image forming apparatus 100 is operated in accordance with the weekly schedule set by the similar process as executed in image forming apparatus 100 in the system in accordance with the present embodiment.

Schedule setting area 754 further includes a schedule addition button 816 operated by the user if the operational mode of a time slot set by pull-down menus 812 and 814 of the specific day pattern designated by pattern identification area 750 is to be set to the operational mode designated by radio button 810. By selecting the time slot as the object of processing using pull-down menus 812 and 814, selecting the operational mode to be set using radio button 810 and pressing addition button 816, then, of the schedule displayed on schedule display area 790, that portion which is designated by pull-down menus 812 and 814 is changed to the color corresponding to the operational mode selected by radio button 810.

Referring to FIG. 11, holiday registration screen 830 includes: specific day tab 710; pattern tub 712; holiday tab 714; a button 840 for displaying a list of holidays; a day of the week designating area 842 for designating a day of the week to be the holiday; a registration button 862 for registering the holiday designated by the day of the week in specific day information storage unit 304; a period designating area 844 for designating specific days one by one in a prescribed time period; and a registration button 890 for storing the specific days designated by period designating area 844 as holidays in specific day information storage unit 304.

On day of the week designating area 842, seven check boxes 860 are displayed, for designating whether each day of the week should be designated as a holiday.

Period designating area 844 includes: a pull-down menu 880 for designating, on the basis of three-months unit, the period in which holidays are to be designated; a last registration time field 882 displaying the date and time when the holiday of the period designated by pull-down menu 880 was registered last time; a check-box columns in which check boxes for designating each day to be a holiday or not, for each day in the three months designated by pull-down menu 880; an all select button 886 for checking all check boxes displayed in check box columns 884; and a selection cancel button 888 for cancelling checking of all check boxes.

Figure 12:
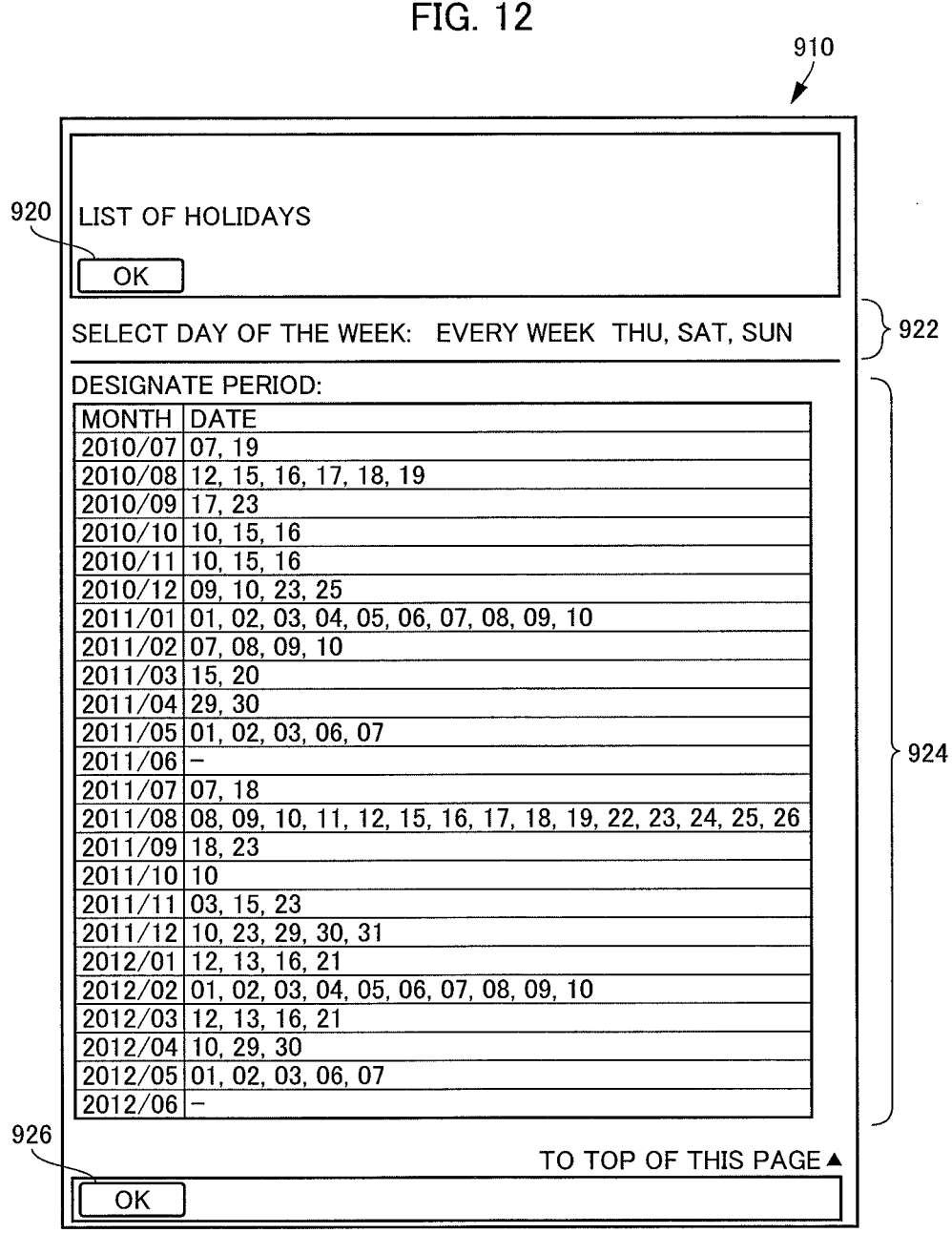
FIG. 12 shows an example of a screen displaying a list of holidays.

Referring to FIG. 12, a holiday list screen 910 displayed when button 840 shown in FIG. 11 is pressed includes: OK buttons 920 and 926 for closing this screen; an area 922 for displaying holidays designated by days of the week; and an area 924 for displaying holidays designated individually by designating the period.

Figure 13:
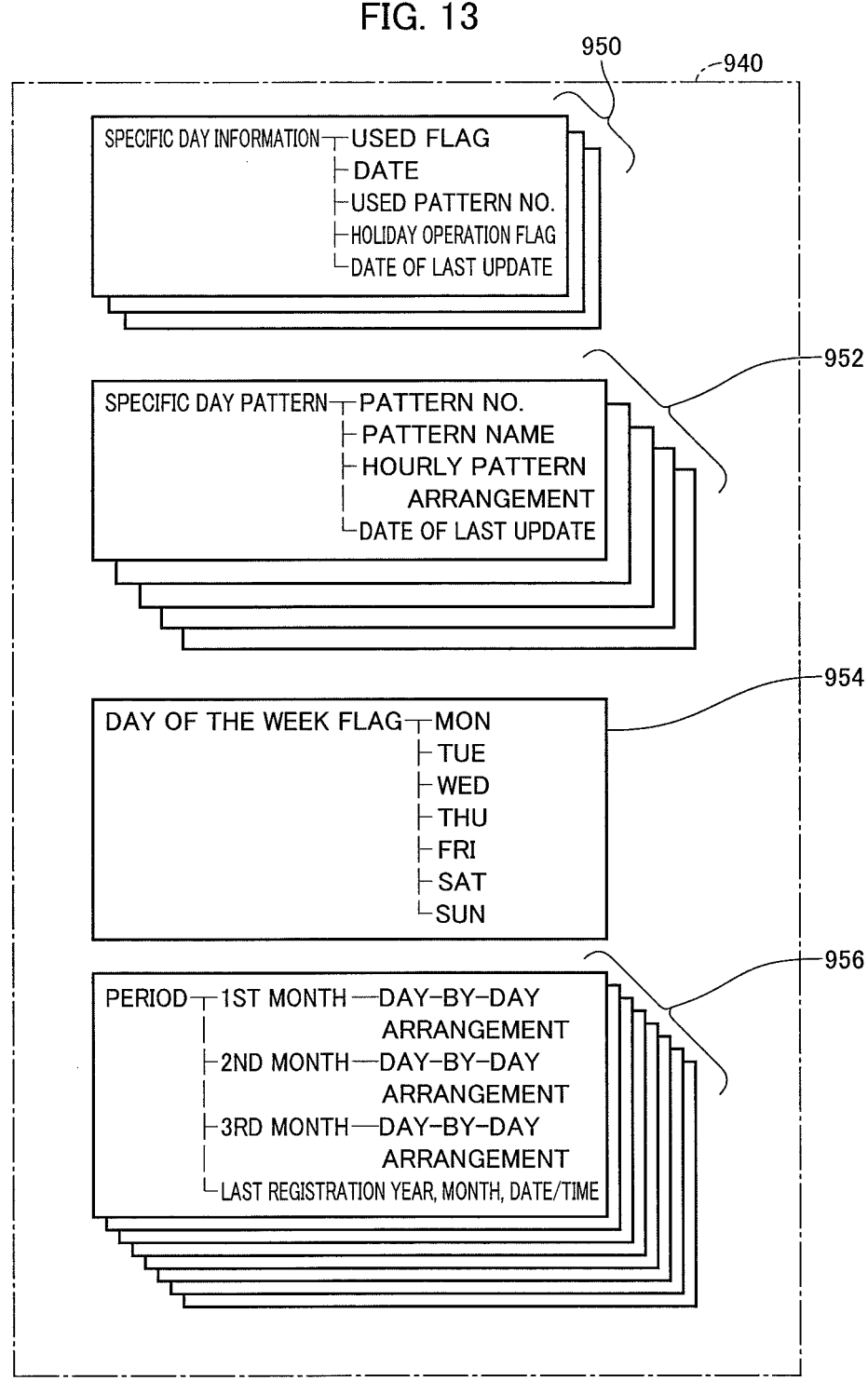
FIG. 13 shows data configuration for setting the energy saving patterns of specific days, used in the image forming apparatus in accordance with an embodiment of the present invention.

Referring to FIG. 13, specific day information 940 stored in specific day information storage unit 304 (see FIG. 6) includes: three specific day information records 950 for storing information related to three specific days; specific day pattern records 952 storing information related to four specific day patterns; a day of the week flag record 954 storing whether or not each day of the week is designated as a holiday; and periodic holiday records 956 storing holidays designated individually by designating a period, for 24 months, on three-months basis.

Specific day information records 950 are to store information designated by specific day registration screen 680 (FIG. 9). Each record of specific day information records

950 includes: a use flag indicating if the specific day corresponding to the record is designated; the date of specific day; the number of specific day pattern used for the specific day; a holiday operation flag indicating whether the specific day is to be moved forward, postponed or cancelled if the specific day falls on a holiday; and a date of last update of the specific day information record 950. The date of specific day is designated by any of 1 to 31 or 99. Namely, 1 to 31 indicates the designated date, and 99 indicates end of month. The holiday operation flag is indicated by any of three values from 0 to 2, where 0, 1 and 2 represent moving forward, postpone and cancel of the specific day, respectively.

Specific day pattern records 952 are for storing information set by specific day pattern registration screen 720 (FIG. 10). Each record includes pattern number (1 to 4) of the specific day pattern, pattern name, a sequence of hourly operational patterns of the designated pattern, and date of last update of the pattern.

Day of the week flag record 954 is for storing information set by a day of the week designating area 842, of holiday registration screen 830 (FIG. 11). Day of the week flag record 954 includes seven flags prepared for respective days of the week to indicate whether it is a holiday.

Periodic holiday records 956 are for storing information set by a period designating area 844 of holiday registration screen 830 (FIG. 11). Each record of periodic holiday records 956 includes day-by-day holiday arrangement of the first, second and third months corresponding to the record, and information of the date and time of last registration.

<Program Configuration>

In the following, for simplicity of description, a configuration will be described assuming that the energy saving operation pattern of image forming apparatus 100 is set from an external PC through web server 280. It is noted, however, that the energy saving pattern can be set through an interactive process using touch-panel display 130 of image forming apparatus 100 based on the same concept. If touch-panel display 130 of image forming apparatus 100 is used to activate a browser and to access to web server 280, a program for stand-alone settings in image forming apparatus 100 is unnecessary.

Figure 14:
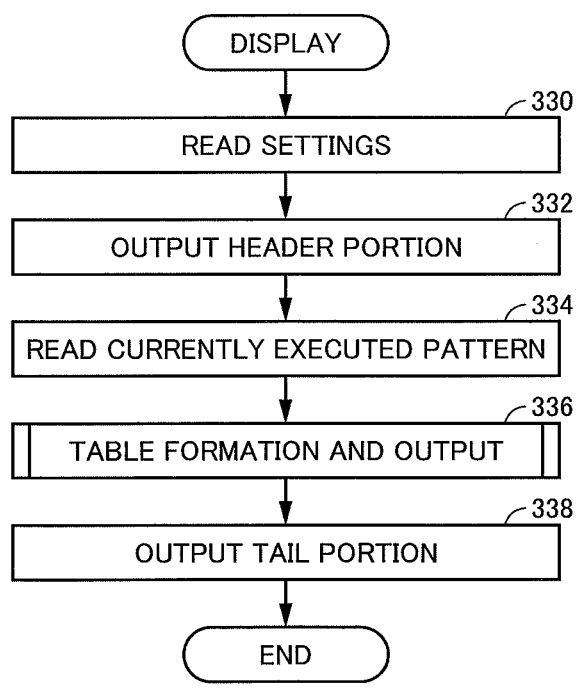
FIG. 14 is a flowchart representing a control structure of a program displaying result of learning of the energy saving operation pattern in the image forming apparatus shown in FIG. 4.

Referring to FIG. 14, the program for realizing display processing unit 286 shown in FIG. 6 is called and activated from a menu screen displayed when the web server of image forming apparatus 100 is logged-in. The program includes: a step 330 of reading a setting related to the energy saving operation pattern among the settings of image forming apparatus 100, from setting storage unit 282; a step 332 of outputting the header portion of screen shown in FIG. 8; a step 334 of reading a schedule of the energy saving operation pattern currently being executed by image forming apparatus 100 from pattern storage unit 278; a step 336 of forming and outputting a document for displaying energy saving operation pattern table 358 of FIG. 8 based on the information read at step 334; and a step 338 outputting the tail portion of the screen shown in FIG. 8 and ending the process.

In the system in accordance with the present embodiment, the program is configured such that the document transmitted by the program through web server 280 to the PC will be a web document and, therefore, the screen shown in FIG. 8 can be viewed on the PC using a common web browser.

Figure 15:
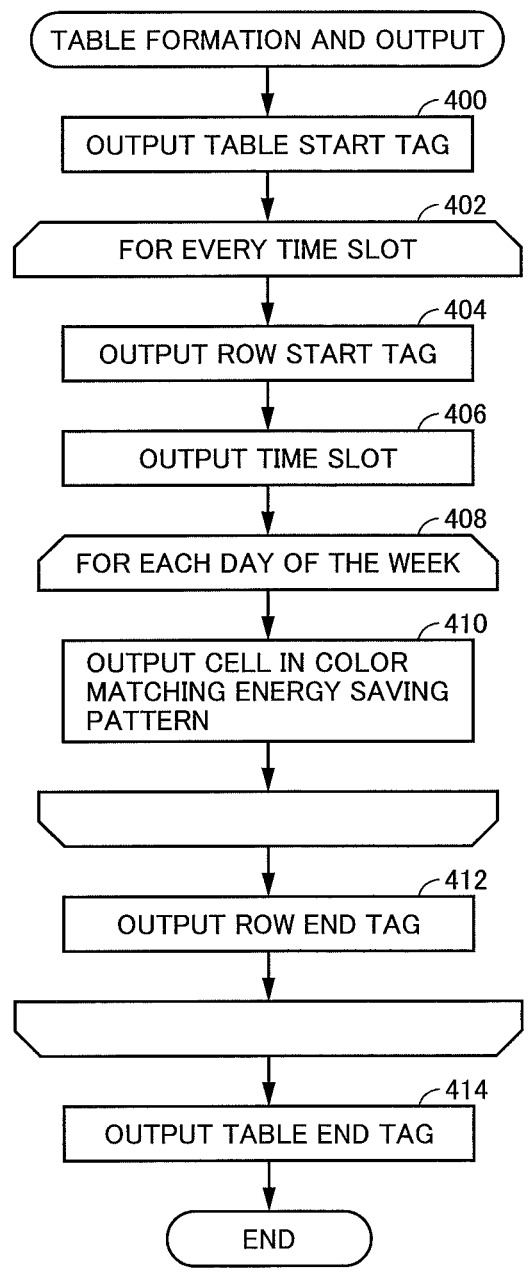
FIG. 15 is a flowchart representing a control structure of a program for visually displaying time-change of the energy saving operation pattern, including the result of learning of the energy saving operation pattern, operational modes set by the user and the like, in the image forming apparatus shown in FIG. 4.

Referring to FIG. 15, the program routine of step 336 shown in FIG. 14 is also called by a process other than the present process and, therefore, it will be described here as a sub-routine. If this process is realized by a program language of script type format, it is preferred that actually this portion of the program is prepared as an independent file and at the time of execution, scripts in the file are included in another program.

The program includes: a step 400 of outputting a table start tag for displaying energy saving operation pattern table 358 on the web document; a step 402 of repeating steps 404, 406, 408, 410 and 412, which will be described later, for every time slot, to form the body of the table; and a step 414 of ending the process by outputting a table end tag, when repetition of step 402 is completed.

The process executed for each time slot at step 402 includes: a step 404 of outputting a start tag of a row displaying information of the time slot; a step 406 of outputting characters representing the time slot; a step 408 of repeating the following step 410 for each day of the week from Monday to Sunday, to form one row of the table related to a specific time slot; and a step 412 of outputting a row end tag indicating an end of a row formed at step 408. At step 410, start tag and end tag for each cell are output and, at that time, information for designating cell width to a fixed value, and information for designating cell background color in accordance with the energy saving operation pattern allocated to the time slot of the day of the week, are embedded in the start tag.

By executing the program shown in FIG. 15, such a display as represented by energy saving operation pattern table 358 shown in FIG. 8 can be realized.

(Registration Program)

Figure 16:
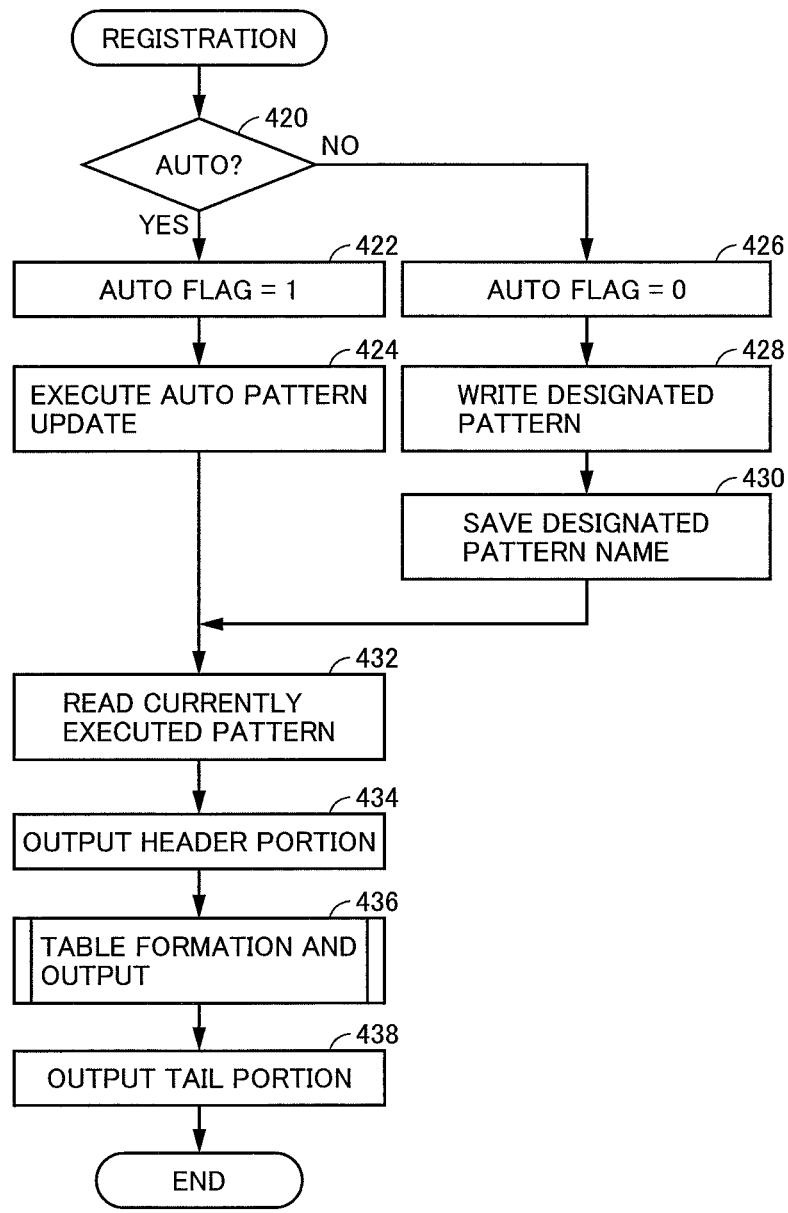
FIG. 16 is a flowchart representing a control structure of a program for registering, in accordance with a user instruction, whether the image forming apparatus shown in FIG. 4 is to be operated in accordance with the schedule of energy saving operation pattern learned automatically, or to be operated in accordance with the schedule set by the user.

The registration program shown in FIG. 16 is activated by web server 280 when registration button 350 or 380 shown in FIG. 8 is pressed. Here, parameters in accordance with a value set for each element on the screen of FIG. 8 are passed as arguments to the program. The arguments includes: information as to whether auto mode or manual mode is designated as the operational mode; a user pattern name selected if the manual mode is selected; a flag (state of check box 360) indicating whether or not a user pattern is to be edited; and an energy saving pattern name (a result of selection of pull-down menu 362 for selecting the energy saving mode), day of the week (a result of selection of pull-down menu 364 for selecting the day of the week), a start time (start time pull-down menu 366) and an end time (end time pull-down menu 368) of the time slot as the object of setting, which become effective if check box 360 is checked. Information of the pattern name field 372 is not passed to this program.

The registration program includes: a step 420 of determining whether the auto mode or manual mode is designated, based on the argument; a step 422 executed if the auto mode is designated, of storing 1 in the auto flag of setting storage unit 282; and a step 424 of executing an auto pattern updating process (process by auto pattern updating unit 274 shown in FIG. 6) to update the energy saving operation pattern based on the latest job log.

The program further includes: a step 426, executed if it is determined at step 420 that the operational mode is not the auto mode, of storing 0 in the auto flag of setting storage unit 282 of FIG. 6; a step 428 of reading the user pattern designated by the user from user pattern storage unit 284 shown in FIG. 6 and writing it in pattern storage unit 278, based on the argument; and a step 430 of storing the pattern name of the written user pattern in setting storage unit 282.

In this program, after steps 424 and 430, the control flows are merged and a step 432 of reading the energy saving operation pattern that is currently being executed, stored in pattern storage unit 278 is executed. The program further includes: a step 434 of outputting the header portion of energy saving setting screen shown in FIG. 8 based on the result of step 432 and on setting conditions stored in setting storage unit 282; a step 436 of forming energy saving operation pattern table 358; and a step 438 of outputting the tail portion and ending the process. What is executed at step 436 is the program shown in FIG. 15.

(User Pattern Saving Program)

Figure 17:
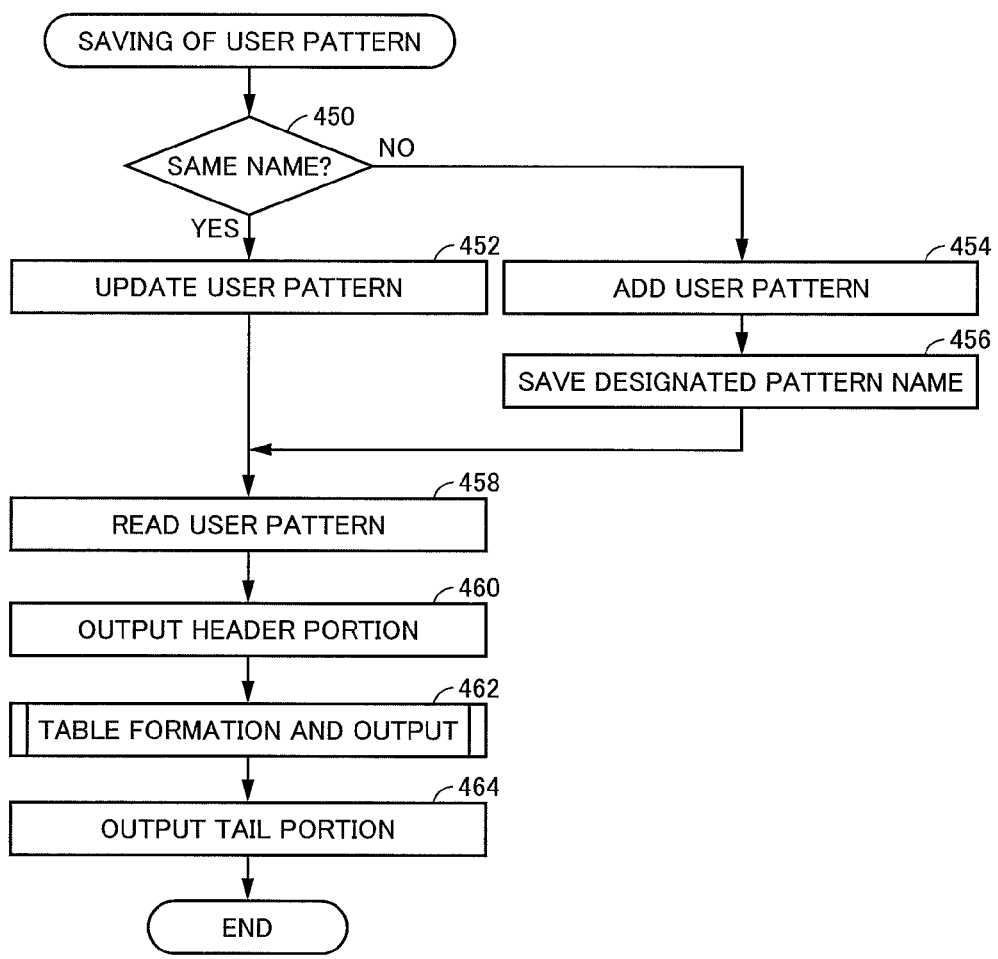
FIG. 17 is a flowchart representing a control structure of a program for saving a user pattern, which is a schedule of the energy saving operation pattern formed by the user, in the image forming apparatus shown in FIG. 4.

The user pattern saving program shown in FIG. 17 is called by web server 280 if save button 374 of FIG. 8 is pressed. At this time, arguments passed to this program includes a specific value of the energy saving pattern corresponding to the displayed energy saving operation pattern table 358, and the user pattern name input to pattern name field 372.

The program includes: a step 450 of determining, based on the argument, whether or not the user pattern of the same name is stored in user pattern storage unit 284 (see FIG. 6); a step 452, executed if the same name exists, of updating the user pattern having the same name as the input user pattern with the pattern represented by the energy saving operation pattern table 358; a step 454, executed if the same name does not exist, of adding the pattern represented by the energy saving operation pattern table 358 to user pattern storage unit 284; and a step 456 of saving the added pattern name to an index area of user pattern storage unit 284.

In this program, after steps 452 and 456, the control flows are merged, and at step 458, the user pattern updated at step 452 or added at step 454 is read from user pattern storage unit 284. Using the user pattern, the header portion is output (step 460), the table is formed and output (step 462), the tail portion is output (step 464), and the process ends. As a result of this process, the user pattern designated by the user to be saved is saved in user pattern storage unit 284, and on the energy saving setting screen, the energy saving operation pattern table 358 in accordance with the saved user pattern is displayed.

(Pattern Update)

Figure 18:
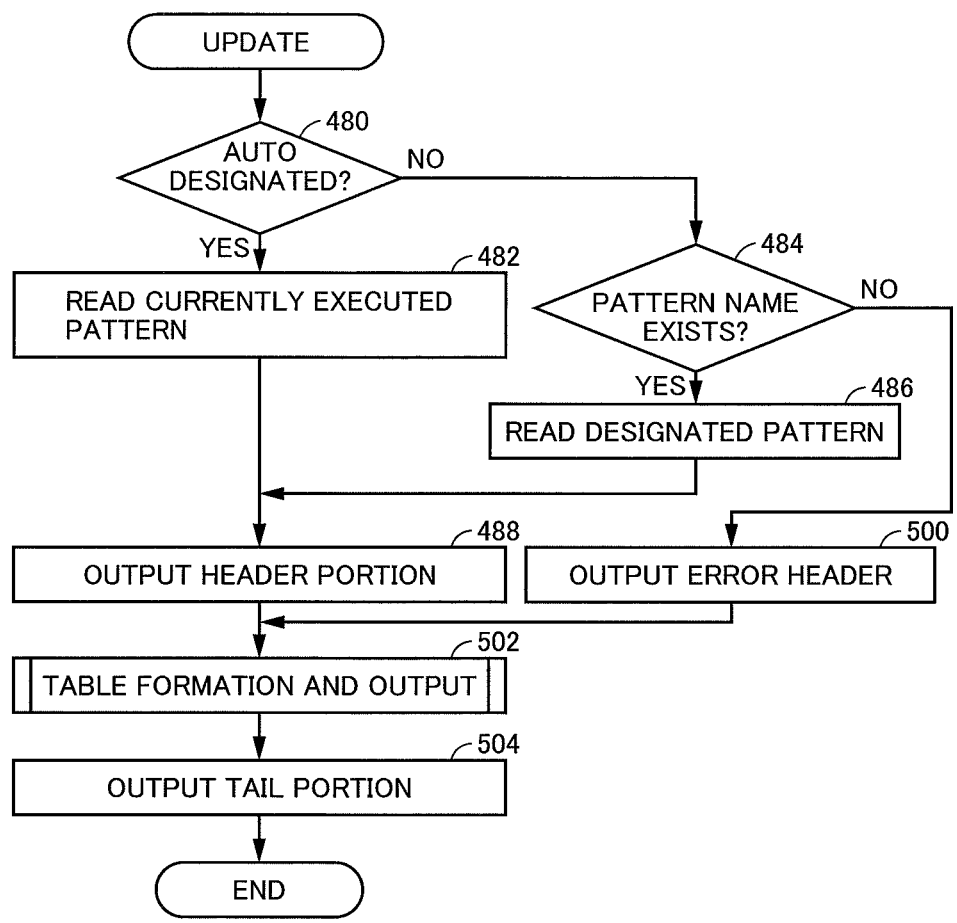
FIG. 18 is a flowchart representing a control structure of a program for updating contents of energy saving settings displayed on a screen, in accordance with a user selection, in the image forming apparatus shown in FIG. 4.

Referring to FIG. 18, the program realizing update processing unit 288 shown in FIG. 6 is activated when update button 352 or 382 shown in FIG. 8 is pressed. The program includes: a step 480 of determining whether the designated operational mode is an auto mode or manual mode; a step 482, executed if the designated operational mode is the auto mode, of reading the energy saving operation pattern that is being executed from pattern storage unit 278; a step 484, executed if the designated operational mode is the manual mode (if the determination at step 480 is negative), of determining whether or not a user pattern having the pattern name as an argument from pull-down menu 356 for setting the user pattern exists in user pattern storage unit 284; a step 486, executed if the user pattern of the designated pattern name exists, of reading the pattern from user pattern storage unit 284; and a step 500, executed if the user pattern of the designated pattern name does not exist, of outputting a header portion indicating an error.

In this program, after steps 482 and 486, the control flows are merged, and at step 488, the header portion is output. Thereafter, at step 502, the table is formed and output, the tail portion is output at step 504, and execution of the program ends. If the user pattern of the designated pattern name does not exist (if determination at step 484 is negative), after executing step 500, the control flow is merged with step 502.

(Table Updating Program)

Figure 19:
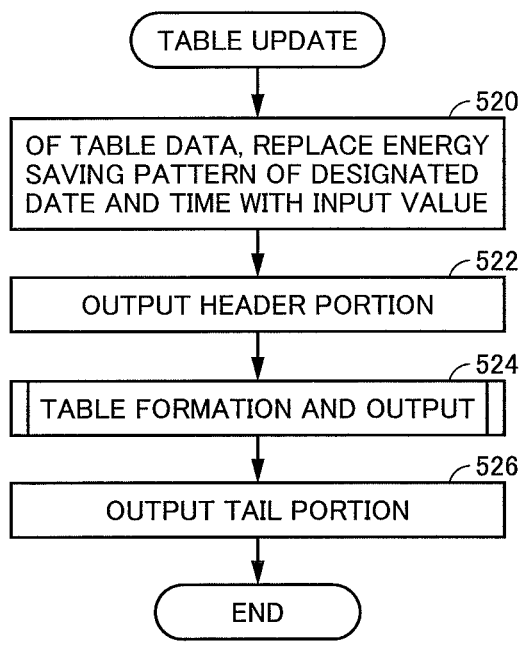
FIG. 19 is a flowchart representing a control structure of a program for updating, when the user modifies the user pattern, the display in accordance with the result of modification, in the image forming apparatus shown in FIG. 4.

Referring to FIG. 19, the program for realizing table update processing unit 294 of FIG. 6 is activated when table update button 370 of FIG. 8 is pressed. In FIG. 8, pull-down menu 362 for selecting the energy saving mode, pull-down menu 364 for selecting a day of the week, pull-down menu 366 for the start time, pull-down menu 368 for the end time and table update button 370 are active only when check box 360 is checked. If check box 360 is not checked, these components are inactive and, hence, table update button 370 cannot be pressed and the program shown in FIG. 19 is not executed. When the program is activated, table data, energy saving pattern name, day of the week, start time and end time as the source of energy saving operation pattern table 358 are passed as arguments from web server 280.

The program includes: a step 520 of replacing the energy saving operation pattern of a range designated by the start time and end time of the day of the week designated by the arguments, of the energy saving operation pattern data shown in energy saving operation pattern table 358, with the energy saving operation pattern indicated by the energy saving pattern name; a step 522 of outputting the header portion based on the energy saving operation pattern data updated in this manner; a step 524 of forming and outputting energy saving operation pattern table 358; and a step 526 of outputting the tail portion and ending the process.

(Auto Pattern Update Program)

Figure 20:
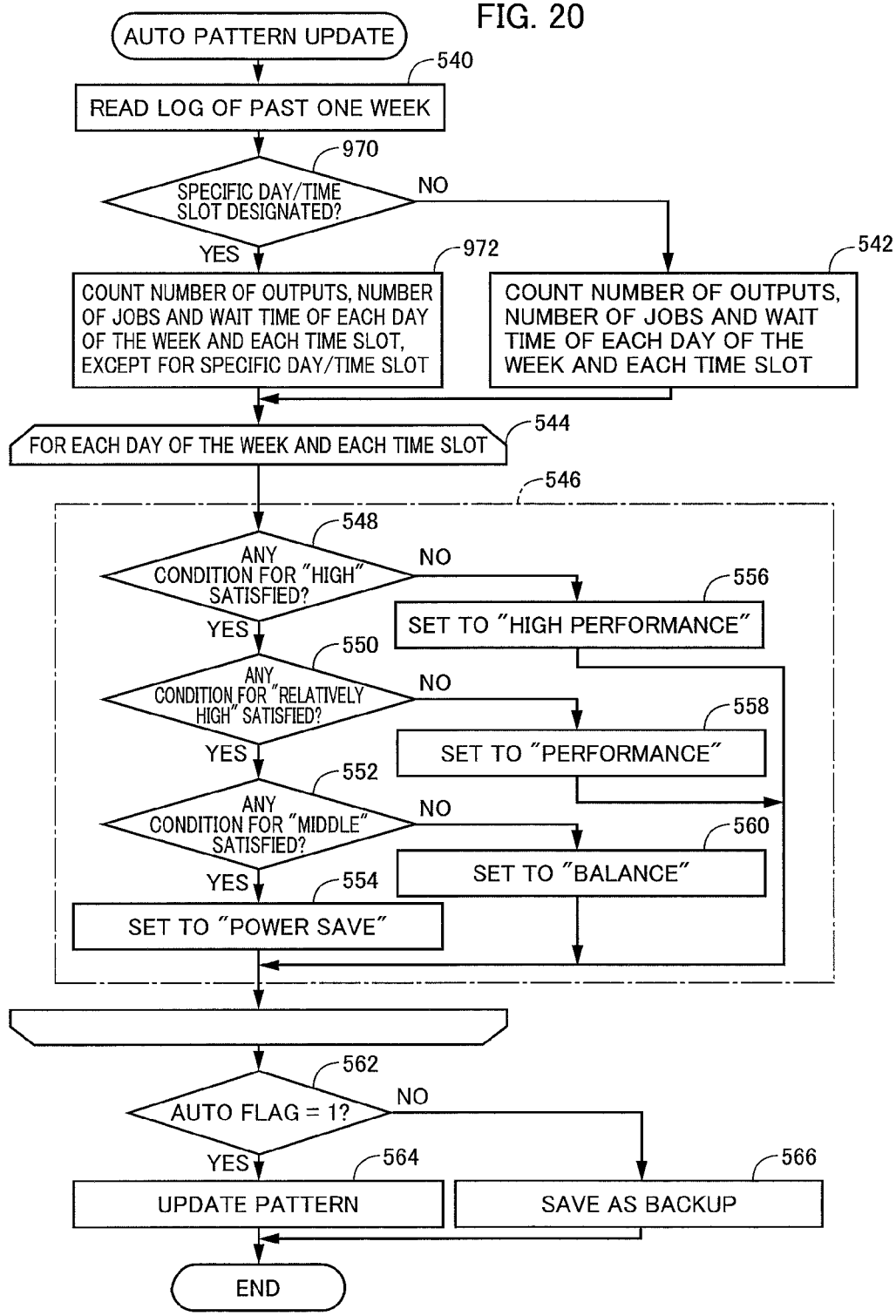
FIG. 20 is a flowchart representing a control structure of a program for automatically learning the energy saving operation pattern of the image forming apparatus, based on job logs over a prescribed time period in the past other than the specific day, in accordance with an embodiment of the present invention.

Referring to FIG. 20, the program for realizing auto pattern updating unit 274 shown in FIG. 6 is executed periodically, using timer 276 shown in FIG. 6. In the system of the present embodiment, even if the auto flag is 0, that is, even if the apparatus is in a mode in which energy saving operation pattern is not automatically learned from the operational status of image forming apparatus 100, the auto pattern updating process is executed and the results are saved. By this approach, it becomes possible to display the energy saving operation pattern updated in accordance with the actual operational status even if the apparatus is operating in the manual mode, and the administrator can use it as a reference when setting image forming apparatus 100.

The program includes: a step 540 of reading, using date and time of job logs stored in log storage unit 272 as a key, all job logs of immediately preceding specific time period (for example, one week); a step 970 of determining whether or not there is a designation of a specific day, with reference to specific day information records 950 shown in FIG. 13, and branching the control flow depending on the result of determination; a step 972, executed if the determination at step 970 is positive, of reading specific day pattern record 952, day of the week flag record 954, and periodic holiday records 956 shown in FIG. 13, and using only the job logs of days not designated as the specific day and only the job logs of a time slot or time slots set to "follow weekly schedule" of the job logs of the day designated as the specific day, counting and collecting the number of outputs, number of jobs and the wait time day by day of the week and time slot by time slot; and a step 542 of counting the number of outputs of sheets of recording paper, the number of processed jobs and the total wait time day by day of the week and time slot by time slot, based on the job logs read at step 540, and thereby calculating the rate of operation.

At step 972, if a specific day is set, auto pattern updating unit 274 further reads specific day pattern record 952, day of the week flag record 954 and periodic holiday record 956 from specific day information 940. Auto pattern updating unit 274 further specifies a day, for which the specific day pattern is set and the specific pattern is designated, based on the read information. Here, the date of specific day information record 950 and the information read from day of the week flag record 954 and periodic holiday record 956 are referred to, to determine whether the day designated as the specific day in specific day information record 950 falls on a holiday. If it is determined that the specific day falls on a holiday, whether the specific day is to be moved forward, postponed or cancelled is determined, by checking the holiday operation flag of specific day information record 950.

After the day or days on which the specific day schedule is to be executed are determined in this manner, auto pattern updating unit 274 counts and collects, based on the logs obtained at step 540, the number of outputs, the number of jobs and wait time of image forming apparatus 100 day by day of the week and time slot by time slot, for the time slots set to "follow the weekly setting" among the days on which the specific day schedule is to be executed and all time slots of days not designated as specific day (step 972). From the result of this process, it is possible to calculated the rate of operation of image forming apparatus 100, for each of the time slots set to "follow the weekly schedule" of the specific day and the time slots other than the specific day or days.

The program further includes: a step 544, executed following step 972 or step 542, of repeating a process 546, which will be described later, for each time slot of each day of the week; a step 562 of determining whether or not the auto flag stored in setting storage unit 282 (see FIG. 6) is 1 or not; a step 564, executed if the auto flag is 1, of updating the energy saving operation pattern stored in pattern storage unit 278 with the energy saving operation pattern formed at step 544, and ending the process; and a step 566, executed if the auto flag is 0, of adding and storing the energy saving operation pattern formed at step 544 as a back-up in user pattern storage unit 284, and ending the process. The energy saving operation pattern stored in user pattern storage unit 284 in this manner can be handled in the similar manner as the user pattern, though it is automatically learned.

The process 546 executed on each time slot of each day of the week at step 544 executes, for each time slot of the day of the week, steps 548, 550, 552, 554, 556, 558 and 560, which will be described in the following.

Process 546 includes: a step 548 of determining whether the number of outputs, the number of jobs and the wait time counted for the time slot of the day of the week satisfies any of the conditions to determine the rate of operation to be "high"; a step 556, executed if it is determined at step 548 that any of the conditions is satisfied, of setting the energy saving operation pattern of the corresponding time slot of the corresponding day of the week to "high performance" and ending the process for the time slot of the day of the week; a step 550, executed if it is determined that none of the conditions is satisfied at step 548, of determining whether or not the result of counting satisfies any of the conditions to determine the rate of operation to be "relatively high"; a step 552, executed if it is determined at step 550 that any of the conditions is satisfied, of setting the energy saving operation pattern of the corresponding time slot of the corresponding day of the week to "performance" and ending the process for the time slot of the day of the week; a step 552, executed if it is determined that none of the conditions is satisfied at step 550, of determining whether or not the result of counting satisfies any of the conditions to determine the rate of operation to be "middle"; a step 560, executed if it is determined at step 552 that any of the conditions is satisfied, of setting the energy saving operation pattern of the corresponding time slot of the corresponding day of the week to "balance" and ending the process for the time slot of the day of the week; and a step 554, executed if it is determined that none of the conditions is satisfied at step 552, of setting the energy saving operation pattern of the corresponding time slot of the corresponding day of the week to "power saving" and ending the process for the time slot of the day of the week.

(Program for Generating Specific Day Setting Screen)

The program realizing the process of displaying the specific day registration screen 680 shown in FIG. 9 when button 660 or 662 shown in FIG. 8 is pressed (corresponding to the function of specific day setting screen generating unit 302) has the following control structure. The program operates on the server side, and it has a function of generating HTML source including scripts allowing switching and displaying specific day registration screen 680 shown in FIG. 9, specific day pattern registration screen 720 shown in FIG. 10 and holiday registration screen 830 shown in FIG. 11, and transmitting the source to a counterpart terminal through web server 280.

Figure 21:
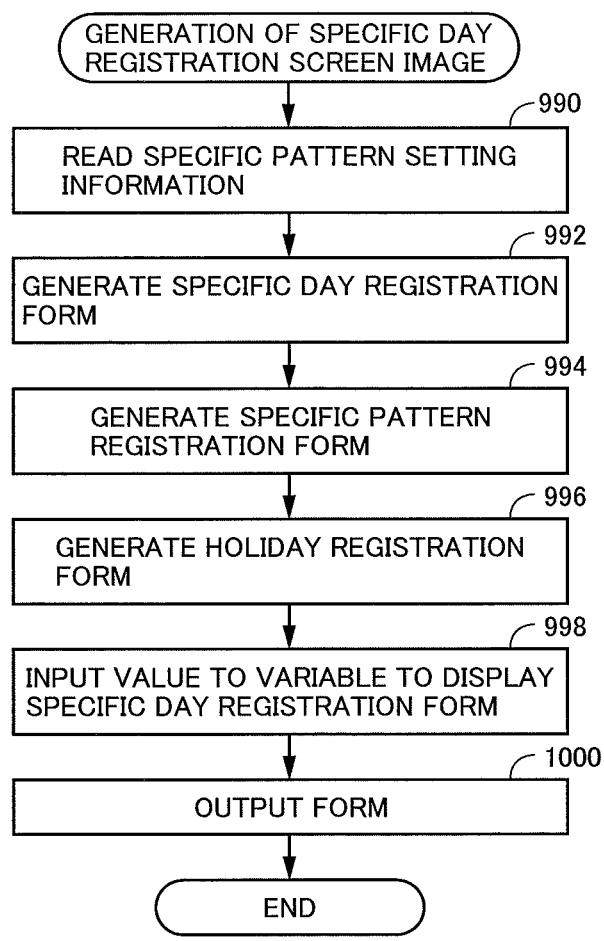
FIG. 21 is a flowchart representing a control structure of a program executed by the image forming apparatus in accordance with an embodiment of the present invention, to output the screen shown in FIGS. 9 to 11.

Referring to FIG. 21, the program includes: a step 990 of reading specific day information 940 (see FIG. 13) from specific day information storage unit 304 shown in FIG. 6; a step 992 of generating HTML source for displaying specific day registration screen 680 (FIG. 9) based on the information read from specific day information records 950 from the information read at step 990; a step 994 of generating HTML source for displaying the specific pattern registration screen 720 (FIG. 10) based on the information read from specific day pattern records 952 from the information read at step 990; a step 996 of generating HTML source for displaying holiday registration screen 830 (see FIG. 11) based on the information read from day of the week flag records 954 and periodic holiday records 956 from the information read at step 990; a step 998 of writing a specific variable and its value in HTML document such that when the HTML source generated in this manner is to be displayed using the browser of the counterpart terminal, the script first displayed by specific day registration screen 680 is executed; and a step 1000 of transmitting the HTML source form generated in this manner through the web server to the counterpart terminal and ending the process.

Specific day registration screen 680 shown in FIG. 9, specific day pattern registration screen 720 shown in FIG. 10 and holiday registration screen 830 shown in FIG. 11 are each screen displaying the HTML source consisting of one or a plurality of forms. In each form, a file name of a program to be executed next through web server 280 when a prescribed button in the form is pressed is described. When the button is pressed, the file name to be executed next is transmitted to the web server together with the data to be processed by the program, and processed. Such a process is well known as a form process by the web server.

Switching among specific day registration screen 680, specific day pattern registration screen 720 and holiday registration screen 830 is executed by pressing specific day tab 710, pattern tab 712 and holiday tab 714, as described above. This switching is realized by classifying UI components forming respective screens to groups, and setting property of each UI component such that when a certain tab is pressed, only the UI components of the screen corresponding to the tab are displayed and UI components of other screens are not displayed. This process is realized by a script executed on the browser on the terminal side. It is noted, however, that the script itself is formed by image forming apparatus 100 in the program shown in FIG. 21 and embedded in the HTML source.

It is also possible to form specific day registration screen 680, specific day pattern registration screen 720 and holiday registration screen 830 by separate programs. In that case, when each of the tabs is pressed on the browser of counterpart terminal, the corresponding program is activated in image forming apparatus 100, and the screen corresponding to the pressed tab is transmitted to the browser of the counterpart terminal.

Specific day pattern registration screen 720 of FIG. 10, and holiday registration screen 830 of FIG. 11 can be realized based on the same concept as a master maintenance program of a common system. In the present embodiment, however, specific day registration screen 680 shown in FIG. 9 may involve a process for generating a default specific day pattern to assist the user in forming the specific day pattern, in addition to the common process of master maintenance.

An operator setting the specific day and the specific time slot must designate the specific day and specific date and time, as well as an operation pattern of the date and time. Though the specific day and specific time slot can be set relatively easily, it is not always clear for the operator what operation pattern is good for the date and time. In consideration of such a situation, in the present embodiment, image forming apparatus 100 automatically provides a fairly appropriate default operation pattern. Since image forming apparatus 100 has such a function, burden on the operator can be alleviated. Further, since the default values are obtained by processing job logs, values not exactly matching the operator's intention but "pretty close" can be set.

Here, in the present embodiment, the specific day is designated on monthly basis, as described above. Therefore, different from a common energy saving operation patterns that are counted weekly, the default patterns must be counted monthly. A control structure of a program executing such a process will be described with reference to FIGS. 22 and 23.

Specifically, as a method of realizing this process, an item "default setting" is provided in pull-down menu 734, on specific day registration screen 680 of FIG. 9 described above. If the user selects "default setting" of pull-down menu 734 and presses registration button 692, a default operation pattern is generated by the program of which control structure will be described in the following, and it is set as the operation pattern of the designated specific day.

(Registration of Specific Day)

Figure 22:
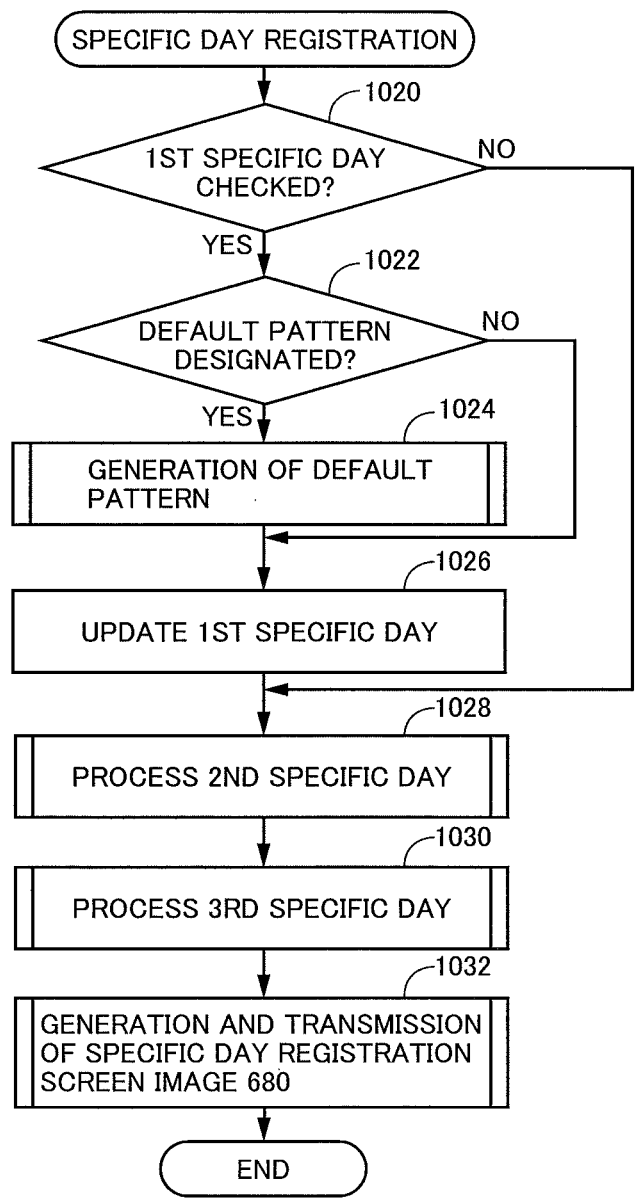
FIG. 22 is a flowchart representing a control structure of a specific day registering program executed by the image forming apparatus when OK button is pressed on the screen shown in FIG. 9.

The program of which control structure is shown in FIG. 22 (realizing the function corresponding to specific day registering unit 300 of FIG. 6) is executed in image forming apparatus 100, when the user presses registration button 692 on specific day registration screen 680. Referring to FIG. 22, the program includes: a step 1020 of determining whether or not a check box 730 (see FIG. 9) of a first specific day is checked or not, and if it is not checked, skipping the process for the first specific day and proceeding to the process of a second specific day; a step 1022, executed if the result of determination at step 1020 is positive, of determining whether or not the default menu is designated by pull-down menu 734; and a step 1024, executed if the determination at step 1022 is positive, of executing a prescribed routine (as will be described later) to generate a default pattern for the first specific day (realizing the function corresponding to default pattern generating unit 306 of FIG. 6). To the default pattern generated here, a tentative pattern number is allocated, and the corresponding specific day pattern record is temporarily generated. If the determination at step 1022 is negative, the control proceeds to step 1026. Similarly, if the determination at step 1022 is negative and the execution of step 1024 ends, the control proceeds to step 1026. At step 1026, the record of first specific day is updated in accordance with an input. Here, if any of the specific day patterns is designated by pull-down menu 734, the specific day pattern is input to the "used pattern number" of specific day information record 950. If the default pattern is designated by pull-down menu 734, the tentative pattern number generated at step 1024 is designated as the "used number."

When the process at step 1026 ends, the control proceeds to step 1028. If the determination at step 1020 is negative, the control also proceeds to step 1028. At step 1028, the process similar to the steps 1020 to 1026 is executed on the second specific day. The object of processing here is the information input to the second specific day information designating area 696 of FIG. 9.

If the process on the second specific day ends in the similar manner, the process for the third specific day is executed at step 1030. The object of processing is information input to the third specific day information designating area 698 of FIG. 9.

When step 1030 ends, at step 1032, specific day registration screen 680 shown in FIG. 9 is displayed with the contents reflecting the results of processing at steps 1020 to 1030. If default patterns are designated, the patterns must be modified by specific day pattern registration screen 720 shown in FIG. 10 and allocated to the first to fifth specific day patterns. Therefore, a message to that effect is displayed on the screen of FIG. 9, and pattern numbers allocated tentatively to the default patterns may be emphasized. Looking at the tentative pattern numbers, the operator designates the tentative pattern numbers in pull-down menu 792 of FIG. 10 and clicks copy execution button 794, whereby it is possible to set the first to fifth specific day patterns to initial values in accordance with the designated default pattern and to modify them to desired patterns.

The default pattern or patterns formed in this manner must be erased at some stage. Possible timing of deletion may be when the default pattern number is no longer stored in any of the specific day pattern numbers of the first to third specific days.

Figure 23:
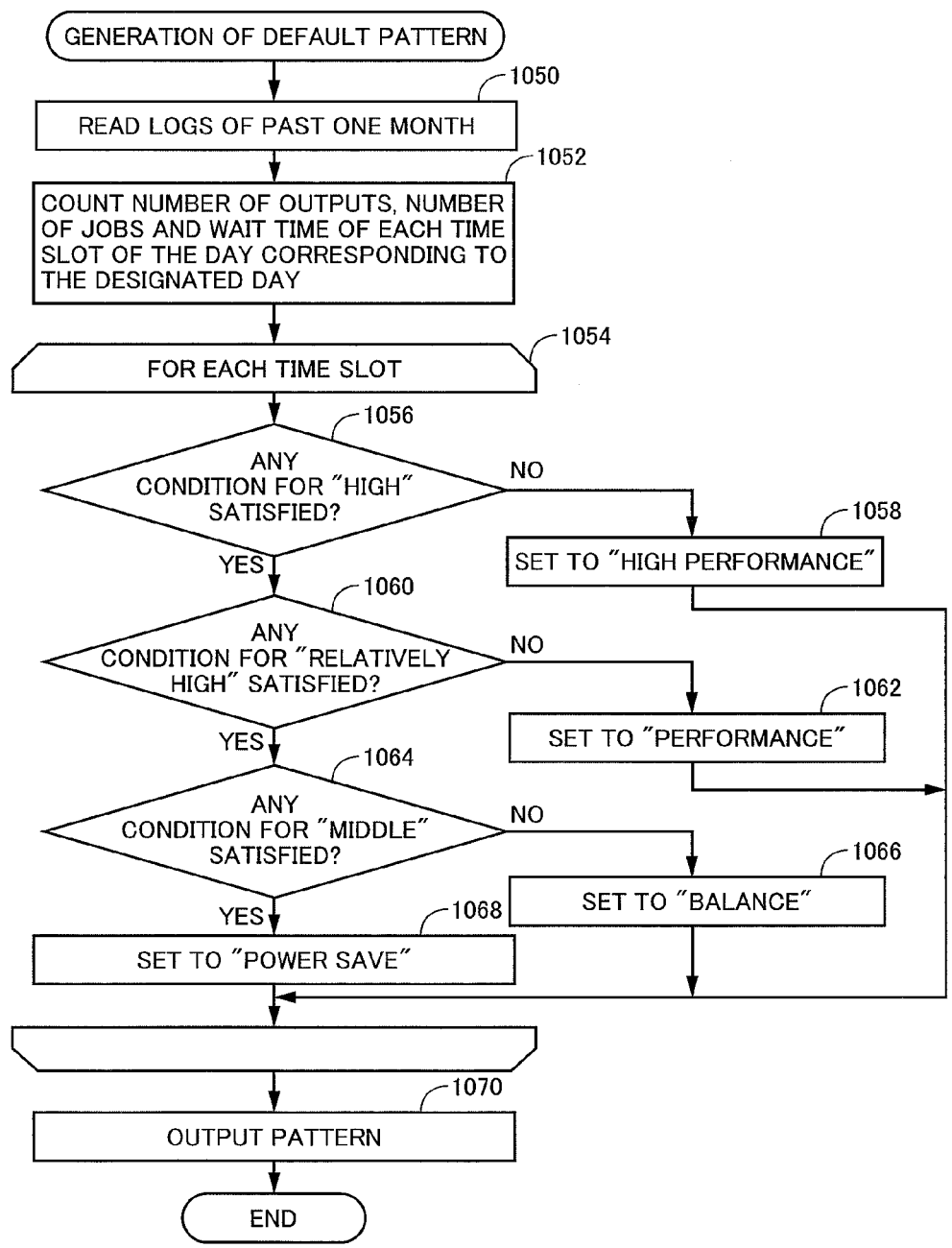
FIG. 23 is a flowchart representing a control structure of the program for generating the default energy saving operation pattern for the specific day.

Referring to FIG. 23, at step 1024 of FIG. 22, a program having such a control structure as described below is executed. Referring to FIG. 23, at step 1050, of the job logs stored in log storage unit 272 shown in FIG. 6, logs of past one month are read. At the next step S1052, for each time slot of a day corresponding to the day designated as the specific day, the number of outputs from image forming apparatus 100, the number of jobs processed by image forming apparatus 100, and wait time of image forming apparatus 100 are counted, respectively. Thereafter, at step 1054, a prescribed process is done for each time slot.

The process executed for each time slot at step 1054 includes: a step 1056 of determining whether or not the result of counting in the time slot as the object of processing among the results of counting at step 1052 satisfies any of the conditions to determine the rate of operation to "high"; a step 1058, executed if it is determined at step 1056 that any of the conditions is satisfied, of setting the energy saving operation pattern of the corresponding time slot to "high performance" and ending the process for the time slot; a step S1060, executed if it is determined at step 1056 that none of the conditions is satisfied, of determining whether or not the result of counting satisfies any of the conditions to determine the rate of operation to "relatively high"; a step 1062, executed if it is determined at step 1060 that any of the conditions is satisfied, of setting the energy saving operation pattern of the corresponding time slot to "performance" and ending the process for the time slot; a step 1064, executed if it is determined at step 1060 that none of the conditions is satisfied, of determining whether or not the result of counting satisfies any of the conditions to determine the rate of operation to "middle"; a step 1066, executed if it is determined at step 1064 that any of the condition is satisfied, of setting the energy saving operation pattern of the corresponding time slot to "balance" and ending the process for the time slot; and a step 1068, executed if it is determined at step 1064 that none of the conditions is satisfied, of setting the energy saving operation pattern of the corresponding time slot to "power saving" and ending the process for the time slot.

If the process steps 1056 to 1068 are completed for every time slot at step 1054, at step 1070, a tentative pattern number is allocated to the resulting pattern and the pattern is output to pattern storage unit 278 of FIG. 6, and its file name with its path and the pattern number are output to specific day information storage unit 304, and the process ends. The tentative pattern number is returned to the main routine shown in FIG. 22, and input, for example, as the pattern number of the first specific day at step 1026.

<<Operation>>

Image forming apparatus 100 operates in the following manner. In the following description, of various functions of image forming apparatus 100, only the operations related to energy saving setting unit 260 will be described, and description of other common functions will not be repeated.

<<Log Collection>>

When image forming apparatus 100 is powered on, log obtaining unit 270 starts to obtain job logs of image forming apparatus 100. The job logs are stored in log storage unit 272.

<Pattern Auto Update Process>

Timer 276 counts time and activates auto pattern updating unit 274 once every hour.

Referring to FIG. 20, auto pattern updating unit 274 obtains logs of immediately preceding prescribed time period (in the system of the present embodiment, one week) from log storage unit 272 (step 540), and executes the following process. First, auto pattern updating unit 274 counts the number of outputs, the number of jobs and the wait time of image forming apparatus 100 day by day of the week and time slot by time slot (step 542). From the results of this process, the rate of operation can be calculated. Further, for each of the day of the week from Monday to Sunday, steps 548 to 554 are repeated. By this process, the energy saving operation pattern of each time slot of each day of the week is set.

Thereafter, at step 562, whether or not the auto flag is 1 is determined. If the result is positive, the energy saving operation pattern stored in pattern storage unit 278 is updated with the newly calculated energy saving operation pattern (step 564), and the process ends. If the result of determination at step 566 is negative, the newly calculated energy saving operation pattern is stored as a backup pattern in user pattern storage unit 284 (step 566), and the process ends.

The updating process of pattern storage unit 278 is completed in this manner.

<Display and Updating of Energy Saving Operation Pattern>

When a user logs in to image forming apparatus 100 from PC 190 for the administrator shown in FIG. 5, for example, a menu for the administrator of image forming apparatus 100 is displayed (not shown) on the screen of PC 190 for the administrator. On this menu, there is displayed an item "Display and Update of Energy Saving Operation Pattern."

If the user selects this item, the request is applied through web server 280 shown in FIG. 6 to display processing unit 286. Specifically, the program shown in FIG. 14 is activated.

Display processing unit 286 first reads various settings stored in setting storage unit 282 (step 330 of FIG. 14). The settings include the table for calculating rate of operation, the table for setting energy saving pattern, the auto flag, and the energy saving operation pattern that is currently used. Thereafter, display processing unit 286 forms the header portion of energy saving setting screen shown in FIG. 5 based on the read settings, and outputs the same (step 332). The output is transmitted through web server 280 to PC 190 for the administrator, and displayed by the web browser operating on PC 190 for the administrator. At step 334, display processing unit 286 reads the energy saving operation pattern that is being currently executed from pattern storage unit 278 (step 334). In accordance with the read energy saving operation pattern, at step 336, the display of energy saving operation pattern table 358 shown in FIG. 8 is formed and output. The display is also transmitted through web server 280 to PC 190 for the administrator, and additionally displayed on the screen, by the browser of PC 190 for the administrator. As a result, on the window of the browser of PC 190 for the administrator, the header portion and the energy saving operation pattern table 358 (see FIG. 8) are displayed. Further, display processing unit 286 adds the tail portion. This display is also applied through web server 280 to the browser of PC 190 for the administrator, and displayed. As a result, such a screen as shown in FIG. 8 is displayed on PC 190 for the administrator.

When the display data is formed, display processing unit 286 displays mode selection radio buttons 354 and pull-down menu 356 for setting user pattern name in accordance with the settings. Check box 360 is not checked, and pull-down menu 362 for selecting energy saving mode, pull-down menu 364 for selecting day of the week, pull-down menu 366 for the start time and pull-down menu 368 for end time, as well as table update button 370 are inactive and grayed-out.

Here, operations available to the user include (A) switching between auto mode and manual mode (mode switching), (B) edition and saving of user pattern, and (C) changing (registration) of energy saving operation pattern to be set in image forming apparatus 100. These options will be described in the following.

(A) Mode Switching

When the user switches the mode to be used, the user presses the radio button of the mode to be selected, of the mode selection radio buttons 354. If the selected mode is the manual mode, further, the user selects which pattern is to be used, by pull-down menu 356 for setting the user pattern name.

When the user presses update button 352, update processing unit 288 shown in FIG. 6 is activated, and energy saving operation pattern table 358 is updated in the following manner.

Referring to FIG. 18, at step 480, whether or not the selected mode is the auto mode is determined. If the result is positive, the energy saving operation pattern that is being executed is read from pattern storage unit 278, and if the result is negative, the user pattern designated by pull-down menu 356 for setting user pattern name is read from user pattern storage unit 284.

After steps 482 and 486, control flows are merged, and at step 488, the header portion is output. In accordance with the read pattern, energy saving operation pattern table 358 is output at step 502 in accordance with the read pattern, the tail portion is output at step 504, and the process ends.

By this process, if the auto mode is designated, the energy saving operation pattern learned from the logs is displayed on energy saving operation pattern table 358, and if the manual mode is designated, the designated user pattern is displayed on energy saving operation pattern table 358.

(B) Edition and Saving of User Pattern

If the user clicks check box 360 while the schedule of energy saving operation pattern is displayed on energy saving operation pattern table 358, check box 360 is checked, and pull-down menu 362 for selecting energy saving mode, pull-down menu 364 for selecting day of the week, pull-down menu 366 for the start time and pull-down menu 368 for end time, as well as table update button 370 are activated. This process is executed not on the server side but on the web browser side of the client.

Of the cells displayed on energy saving operation pattern table 358, the user designates the day of the cell of which setting is desired by pull-down menu 364 for selecting day of the week, designates the time slot by pull-down menu 366 for the start time and pull-down menu 368 for end time, and sets the energy saving pattern to be set for the cell by pull-down menu 362 for selecting energy saving mode. Then, when the user presses table update button 370, table update request is transmitted to the server, and the process for updating the table in accordance with the user input is executed. Specifically, table update processing unit 294 shown in FIG. 6 is activated, and the program shown in FIG. 19 is executed.

Referring to FIG. 19, of the data currently displayed on energy saving operation pattern table 358, to each cell of the day and time slot designated by the user input, a value indicating the designated energy saving pattern is input (step 520). Thereafter, by steps 522, 524 and 526, the screen shown in FIG. 8 is again formed with the modified values, and using web server 280, the thus formed screen is displayed by the browser of the client.

If the user repeats the process described above and forms a desired pattern, the user has the user pattern stored in user pattern storage unit 284. For this purpose, the user displays a desired user pattern name in pattern name field 372, and presses save button 374 shown in FIG. 8. As a result, a request for saving the user pattern is transmitted to web server 280, and user pattern saving unit 292 is activated. User pattern saving unit 292 executes the program shown in FIG. 17. It is noted that in pattern name field 372, the user pattern name displayed on energy saving operation pattern table 358 is displayed as a default.

Referring to FIG. 17, at step 450, whether or not the user pattern having the same name as the user pattern name input by the user has already been stored in user pattern storage unit 284 is determined. If the result is positive, the user pattern having the same name stored in user pattern storage unit 284 is updated with the user pattern input by the user (step 452). If the result of step 450 is negative, a new user pattern is added to user pattern storage unit 284 (step 454), and the user pattern name designated by the user is saved in the index of user pattern storage unit 284 (step 456).

After steps 452 and 456, the control flow merges, and the pattern updated at step 452 or added at step 454 is read from user pattern storage unit 284 (step 458), the energy saving setting screen is formed in accordance with the pattern through steps 460, 462 and 464, and the formed screen is displayed by the browser of PC 190 for the administrator. Then, the process ends.

The edition and saving of the user pattern are completed in the above-described manner.

(C) Setting of Energy Saving Operation Pattern

When the pattern called by update button 352 is to be set in image forming apparatus 100, the user presses registration button 350. As a result, a request for registering the pattern is transmitted to web server 280 shown in FIG. 6, and registration processing unit 290 is activated. Registration processing unit 290 executes a program of which control structure is shown in FIG. 16.

Referring to FIG. 16, in the registration process, whether the energy saving operational mode designated by the user is the auto mode or not (manual mode) is determined (step 420). If the result of determination is positive, the auto flag stored in setting storage unit 282 is updated to 1 (step 422), and the auto pattern updating process shown in FIG. 20 is executed (step 424). If the result of determination at step 420 is negative, the auto flag is updated to 0 (step 426), the user pattern designated by the user is written to pattern storage unit 278 (step 428), and the pattern name of the written pattern is saved as the name of the pattern that is currently being executed, in setting storage unit 282.

After steps 424 and 430, the control flow merges, the pattern that is currently being executed is read from pattern storage unit 278 (step 432), the energy saving setting screen (FIG. 8) in accordance with the pattern is formed through steps 434, 436 and 438, and the screen is transmitted to the client. Then, the process ends.

In the system of the present embodiment as such, the energy saving operation pattern is automatically determined on weekly basis. Since most of the business activities are on weekly basis, determination of patterns week by week is reasonable. It is noted, however, that not all business activities are on the weekly basis. By way of example, a specific day of each month may be very busy and, in that case, it may be better to specify the energy saving operation pattern on monthly basis. Further, it may be necessary in some cases to determine the energy saving operation pattern on annual basis. If such a particular day exists, the energy saving operation pattern determined on weekly basis may be irrelevant. Therefore, for such a particular day, the energy saving operation pattern may be set manually.

If the method of automatically learning the energy saving operation patterns and the method of setting the energy saving operation pattern manually for the specific day are used mixed with each other, the accuracy of learning the energy saving operation pattern undesirably decreases.

By way of example, a day of the week generally set to the pattern having priority on energy saving operation (for example, Wednesday) may become very busy if it is the end of the month. To cope with such a situation, it may be possible to set the energy saving operation pattern manually if the end of the month is Wednesday.

This approach, however, leads to the following problem. Assume that the end of the month happens to be Wednesday. Since end of the month is a busy time, considerably large amount of logs are recorded. When the time comes to automatically set the energy saving pattern for Wednesdays, the logs of other Wednesdays (not so busy) and the logs of this end-of-the-month Wednesday are read, and based on these logs, the energy saving operation pattern for Wednesdays is set. As a result, if a day of the week is generally not so busy but end of the month happens to fall on that day of the week during the period of log collection for setting the energy saving operation pattern, the setting of energy saving operation pattern could be deviated from the appropriate setting with priority on energy saving to the setting with priority on efficiency.

In order to realize energy saving in an efficient manner, such a problem should be avoided. Operations required of the user for this purpose should desirably be as simple as possible. Further, there is also a problem of holidays in business activities. In the example above, even if the end of the month falls on Wednesday, the day may be not busy if it is a holiday of the company. The day before the holiday, or the day after the holiday may the busy day. The system could be busy even if it is a holiday, depending on situations. In other words, there is a problem of how to process the logs and to calculate the energy saving pattern, if the specific day as described above falls on a holiday.

Image forming apparatus 100 in accordance with the present embodiment operates in the following manner to solve the above-described problem.

<Registration of Specific Day>

When a user is to register a specific day, he/she accesses the web server of image forming apparatus 100 from the browser of PC 190, for example. Then, the energy saving setting screen shown in FIG. 8 is displayed. The operation of image forming apparatus 100 when various UI components, other than buttons 660 and 662, displayed on this screen are operated is the same as that of image forming apparatus 100 of the system in accordance with the present embodiment. Here, assume that the user clicks button 660 or 662.

By this operation, from the browser of PC 190 to web server 280 of image forming apparatus 100, a request designating a file name of the program for realizing a specific day setting screen generating unit 302 is transmitted. Receiving this request, web server 280 selects a program executing module in accordance with the extension of designated file name, and passes the file name to the executing module. Receiving the file name, the executing module reads the file designated by the file name from hard disk 168 (see FIG. 4), and analyzes and executes scripts included in the file. Depending on the executing module, the designated file may be a binary object file.

The program related to button 660 or 662 is the one having such a control structure as shown in FIG. 21. When CPU 166 (see FIG. 4) executes the program, specific day setting screen generating unit 302 of FIG. 6 is realized. Specifically, each of the steps shown in FIG. 21 is executed by CPU 166, and the HTML source for displaying specific day registration screen 680 shown in FIG. 9 is formed and transmitted to the browser of PC 190. On the browser of PC 190, specific day registration screen 680 shown in FIG. 9 is displayed. Here, the HTML source transmitted from image forming apparatus 100 to PC 190 includes not only the HTML source for displaying specific day registration screen 680 but also the HTML source for displaying specific day pattern registration screen 720 of FIG. 10 and holiday registration screen 830 of FIG. 11, as well as scripts for switching the screens on the client side by operating specific day tab 710, pattern tab 712 and holiday tab 714. In the state shown in FIG. 9, of these, only the UI components forming specific day registration screen 680 are shown, and other UI components are not displayed. If pattern tab 712 is pressed, the UI components forming specific day registration screen 680 and holiday registration screen 830 are hidden and only the UI components forming specific day pattern registration screen 720 are displayed. When holiday tab 714 is pressed, only the UI components forming holiday registration screen 830 are displayed, and UI components forming specific day registration screen 680 and specific day pattern registration screen 720 are hidden.

Referring to FIG. 9, assume that the user checks check box 730, sets a specific day in specific day setting area 732, and designates the "default pattern" using pull-down menu 734. Here, as an operation when the specific day falls on a holiday, "move forward" is selected. After setting these, the user clicks registration button 692.

Registration button 692 is related to the program having the control structure of FIG. 22, and a request designating the file name of the program is transmitted from PC 190 to image forming apparatus 100. In image forming apparatus 100, the program having the control structure shown in FIG. 22 is executed. In this example, through the path of steps 1020 and 1022, step 1024 is executed.

At step 1024, the program having the control structure of FIG. 23 is executed. Through steps 1050 and 1052, the job logs of the specific day designated by specific day setting area 732 of FIG. 9 (in this example, the corresponding day of the last month) are read from job log storage unit 272 (see FIG. 6), and the job logs are processed through steps 1054 to 1068, whereby a default pattern is generated. To this default pattern, a tentative pattern number is allocated as the pattern number and pattern name. At step 1024, the generated default pattern record is added to specific day pattern records 952 of FIG. 13. At the following step 1026, on the record corresponding to the first specific day among the specific day information records 950 in specific day information storage unit 304, the used flag (on), date, the tentative pattern number allocated to the default pattern, the designated holiday operation flag (in this example, "0"), and the date and time when the process is executed, are recorded.

In this example, at steps 1028 and 1030, nothing is generated. Finally, at step 1032, based on the updated information, the process similar to that of FIG. 21 is executed again, and the HTML source for displaying specific day registration screen 680 shown in FIG. 9 is generated and transmitted to PC 190.

If any of the patterns prepared in advance (the first to fifth specific day patterns, the pattern entirely set to the second energy saving priority mode (refer to the description of radio button 810 of FIG. 10), and the pattern in which 8:00 to 18:00 are in the first energy saving priority mode and 18:00 to 8:00 are in the second energy saving priority mode) is selected, the process of step 1024 is not executed. At step 1026, the designated pattern number is input to "used pattern number" of specific day information record 950 corresponding to the first specific day.

If the user wishes to modify the default pattern formed for the first specific day, the user presses pattern tab 712 on specific day registration screen 680 shown in FIG. 9. Then, specific day pattern registration screen 720 of FIG. 10 is displayed. When the number of specific day pattern to be modified is designated using pull-down menu 770, the registered pattern corresponding to the selected specific day pattern is displayed on schedule display area 790. When the tentative pattern number of the default pattern formed for the first specific day is selected by pull-down menu 792 and copy execution button 794 is pressed, the default pattern that has been formed for the first specific day is displayed on schedule display area 790.

The user selects the time slot to be modified, from the slot-by-slot operational modes displayed on schedule display area 790 using pull-down menus 812 and 814, designates a new operational mode from radio buttons 810, and presses addition button 816. Then, in the schedule display area 790, the operational mode of the designated time slot is replaced by the designated operational mode. After the desired pattern is formed in this manner, the user presses registration button 692 or 756. Then, of the specific day pattern records 952 shown in FIG. 13, the record of specific day pattern designated by pull-down menu 770 of specific day pattern registration screen 720 is updated in accordance with the contents input to specific day pattern registration screen 720. The display of specific day pattern registration screen 720 is also updated in accordance with the result.

After the specific day pattern is modified based on the default pattern, the specific day pattern after modification is designated in pull-down menu 734 for the first specific day, on specific day registration screen 680 shown in FIG. 9. Then, as the energy saving operation pattern of the day designated by specific day setting area 732, the pattern originated from the pattern based on the job logs of the same day last month can be registered.

If the user wishes to change holiday setting, the user presses holiday tab 714. Then, holiday registration screen 830 shown in FIG. 11 is displayed on the browser window. The contents displayed here reflect the contents registered in day of the week flag records 954 and periodic holiday records 956 of specific day information 940 (FIG. 13). It is noted, however, that the period displayed here (specified by pull-down menu 880) is three months including the date of operation in the present embodiment. When the user checks or unchecks check boxes of respective days of the week to be designated or not to be designated as a holiday in day of the week designating area 842 and presses registration button 862, day of the week flag records 954 are updated in accordance with the user operation. When the user operates pull-down menu 880 of FIG. 11 and selects a period to be set, holiday registering unit 298 reads the record corresponding to the selected period from periodic holiday records 956 of specific day information 940, and updates the period designating area 844 in accordance with the contents. When the user checks or unchecks check boxes of period designating area 844 and presses registration button 890, of the periodic holiday records 956 of specific day information 940, the contents of the record designated by pull-down menu 880 are updated in accordance with the contents of check box columns 884. Holiday registering unit 298 updates holiday registration screen 830 in accordance with the result of update.

When the user wishes to view the list of set holidays, he/she presses button 840 of holiday registration screen 830 of FIG. 11. Then, holiday registering unit 298 reads day of the week flag records 954 and periodic holiday records 956 of FIG. 13, in accordance with the results, generates HTML source of holiday list screen 910 shown in FIG. 12 and transmits it to the browser of PC 190. The browser displays the HTML source on the window.

Of the processes described above, the processes for generating specific day pattern registration screen 720 of FIG. 10, holiday registration screen 830 of FIG. 11 and holiday list screen 910 of FIG. 12 and the processes for updating specific day pattern records 952, day of the week flag records 954 and periodic holiday records 956 of FIG. 13 can readily be realized by using the technique of updating a master table in a common data management system. Generation of holiday list screen 910 involves only the reading of data and generation of HTML source and, therefore, it can more easily be realized than the processes related to specific day pattern registration screen 720 and holiday registration screen 830.

<Automatic Pattern Updating Process>

Auto pattern updating unit 274 determines, based on the read information, whether or not a specific day is set in image forming apparatus 100.

If no specific day is set, the control proceeds to step 542.

If any specific day is set, auto pattern updating unit 274 reads specific day pattern records 952, day of the week flag records 954 and periodic holiday records 956 from specific day information 940. Further, based on the read information, auto pattern updating unit 274 specifies the day for which a specific day pattern is set and a specific pattern is designated, based on the read information. Here, referring to the date of specific day information records 950 and information read from day of the week flag records 954 and periodic holiday records 956, whether or not the day designated as the specific day in specific day information record 950 falls on a holiday is determined. If the specific day is determined to fall on a holiday, the holiday operation flag of specific day information record 950 is referred to, to determine whether the specific day is to be moved forward, postponed or cancelled.

After the day in which the specific day schedule is to be executed is determined, auto pattern updating unit 274 counts the number of outputs, the number of jobs and the wait time of image forming apparatus 100, day by day of the week and time slot by time slot, based on the logs obtained at step 540, for the time slot or time slots set to "follow weekly schedule" of the day on which the specific day schedule is executed and for all the time slots of days not designated as the specific day (step 972). From the results of this process, the rate of operation of image forming apparatus 100 in each of the time slots set to "follow weekly schedule" of the specific day and every time slot of days not designated as the specific day can be calculated. The subsequent process is the same as that of auto pattern updating unit 274 of the system in accordance with the present embodiment.

<<Effects of the System in Accordance with the Present Embodiment>>

As described above, by image forming apparatus 100 of the system in accordance with the present embodiment, the energy saving operation patterns are updated automatically based on logs and, in addition, the patterns can be confirmed on the screen. Therefore, the administrator can grasp in what pattern image forming apparatus 100 is operating and, therefore, it becomes possible to effectively manage image forming apparatus 100. Further, automatically learned pattern and the pattern formed by the user can be switched. Therefore, if the pattern learned from past job logs is considered irrelevant, for example, when image forming apparatus 100 is moved to a different department, the settings of image forming apparatus 100 can be done manually. Thus, operation of image forming apparatus 100 in a pattern not matching the actual operational status can be avoided.

Therefore, the energy consumption of image forming apparatus 100 can be reduced, taking into account the operational status.

Regarding the operation of image forming apparatus 100, a schedule different from the schedule automatically calculated on weekly basis can be set, designating a specific day not on a weekly basis, using a unit of repetition not on a weekly basis (in the present embodiment, monthly basis). Therefore, image forming apparatus 100 can be operated in an energy saving operation schedule better adjusted to the actual situation of the place of business. Further, when the energy saving operation pattern for image forming apparatus 100 is calculated on weekly basis, a time slot or time slots for which a specific energy saving operational mode is designated of a specific day are excluded from the calculation. Therefore, the energy saving operation pattern calculated on weekly basis is free from the influence of the day in which image forming apparatus 100 operates in a different, particular operation pattern, and hence, the accuracy of energy saving operation pattern can be enhanced.

If the operation pattern of a specific day is to be designated and when calculation of a default pattern is designated, default pattern generating unit 306 of image forming apparatus 100 generates a default energy saving operation pattern, based on job logs of the corresponding day in the past (in the present embodiment, the corresponding day of last month), for the specific day. The energy saving operation pattern is based on the job logs of the corresponding day of last month and, therefore, it is "pretty close" to the operation pattern to be set for the specific day. The operator does not need to calculate various statistics or to monitor operational status of the apparatus to determine the operation pattern for the specific day. As a result, burden on the operator for setting the specific day can be alleviated.

[Second Embodiment]

In the first embodiment described above, default pattern generating unit 306, auto pattern updating unit 274, specific day pattern registering unit 296, holiday registering unit 298, specific day registering unit 300 and specific day setting screen generating unit 302 and the like are all provided in energy saving setting unit 260 in image forming apparatus 100. Further, holiday list screen 910 shown in FIG. 12 is also generated in holiday registering unit 298. The present invention, however, is not limited to such an embodiment. By way of example, these functions may be realized by a different server. Further, holidays and the like are generally determined uniformly in the place of business and, therefore, it may be preferable to uniformly manage holiday list screen 910 on a server in the place of business, rather than on each image forming apparatus. Based on such considerations, in the second embodiment, pattern updating, comparison with the actual operation, and setting of specific day are executed by an energy saving management server, and holidays are managed by a holiday management server.

Figure 24:
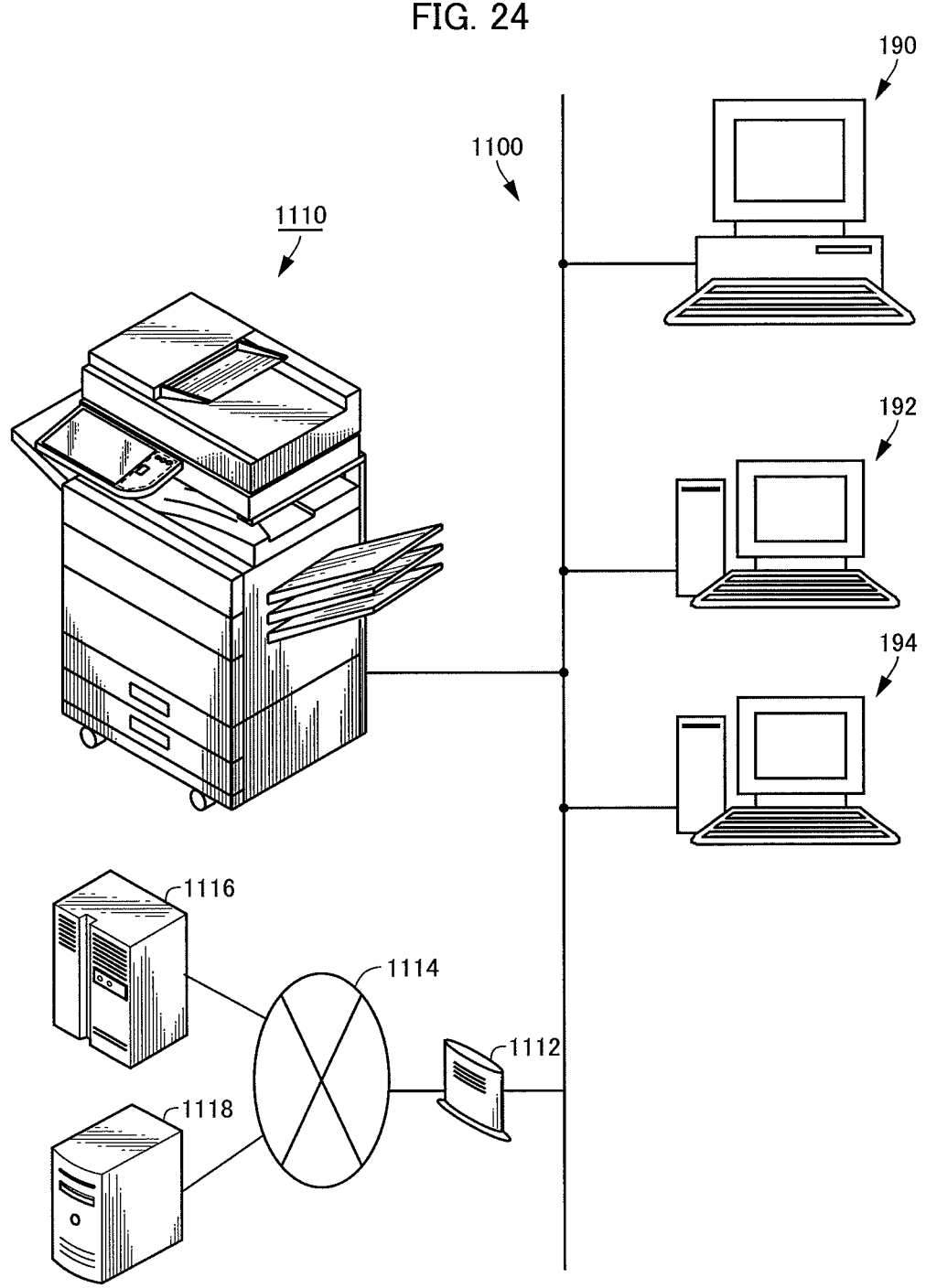
FIG. 24 is a block diagram showing a schematic configuration of a network system 1100 in accordance with a second embodiment of the present invention.

FIG. 24 is a schematic block diagram of a network system 1100 in accordance with the second embodiment. Different from network system 180 of the first embodiment, network system 1100 includes a router 1112 providing connection to the Internet 1114 to network system 1100, and an energy saving management server 1116 and a holiday management server 1118, both connected to the Internet 1114. Further, network system 1100 includes, in place of image forming apparatus 100 shown in FIG. 14, an image forming apparatus 1110 having a function of communicating with energy saving management server 1116 and holiday management server 1118 and operating in accordance with the energy saving operation pattern determined by energy saving management server 1116.

Energy saving management server 1116 has functions corresponding to auto pattern updating unit 274, specific day registering unit 300, specific day pattern registering unit 296 and default pattern generating unit 306 of the first embodiment shown in FIG. 6. Energy saving management server 1116 further has a function of periodically collecting job logs from image forming apparatuses such as image forming apparatus 1110 in network system 1100.

Energy saving management server 1116 has functions of managing the specific day and the specific day pattern of image forming apparatus 1110, collecting job logs of image forming apparatus 1110 and the like and periodically determining the energy saving operation pattern of each image forming apparatus, in response to operations from PC 190 and the like. These can be realized by providing auto pattern updating unit 274, specific day registering unit 300, specific day pattern registering unit 296, default pattern generating unit 306, specific day information storage unit 304 and the like of the first embodiment in energy saving management server 1116, and regarding the holiday information, by obtaining necessary information from holiday management server 1118.

Holiday management server 1118 has the function of holiday registering unit 298 of image forming apparatus 100 of the first embodiment and, therefore, it can manage the holiday information to be managed uniformly in image forming apparatus 1110 in response to an operation from PC 190. If there is a request for information related to a holiday from image forming apparatus 1110, PC 190 or the like, holiday management server 1118 returns necessary information. Functions necessary to do so are as described with reference to holiday registering unit 298 and holiday registration screen 830 of FIG. 11 in the first embodiment.

It goes without saying that energy saving management server 1116 and holiday management server 1118 are integrated in one server. In that case, energy saving setting unit 260 shown in FIG. 6 is moved, substantially unchanged, to the server, log obtaining unit 270 is adapted to have the function of collecting job logs of each image forming apparatus in network system 1100, and log storage unit 272 is adapted to have a function of storing the job logs of each image forming apparatus. By performing the process similar to that of the first embodiment in each of the image forming apparatuses, the energy saving operation patterns for respective days of the week, the specific day pattern for the specific day, and the actual pattern for the specific day are formed. The energy saving operation pattern and the specific day pattern formed for each image forming apparatus are stored in pattern storage unit 278 and specific day information storage unit 304, respectively, together with information for distinguishing the image forming apparatuses from each other. These pieces of information are transmitted and stored at appropriate timing to the corresponding image forming apparatus and stored. Each image forming apparatus controls the operational mode of itself in the similar manner as image forming apparatus 100 in accordance with the first embodiment, based on the energy saving operation pattern and the specific day pattern.

In the embodiment described above, regarding the collection for a specific day, calculation on monthly basis is used as an example where calculation on weekly basis is not appropriate. The present invention, however, is not limited to such an embodiment. In most cases, it is sufficient to have auto pattern registered on weekly basis and to calculate on monthly basis for the specific day. In some cases, however, a unit longer than one month, for example, three months may be used to determine the specific day. In that case, in addition to the monthly counting, the rate of operation per every three months is calculated. It is also possible to determine the specific day in every ten days or on bi-weekly basis, as a unit shorter than a month. These units are determined by the actual progress of business activities, and the system can easily be adapted to the actual business environment.

As described above, according to the present invention, logs are collected in a certain period of time (for example, on a weekly basis) and the energy saving operation pattern of the image forming apparatus is determined based thereon; and a specific day is provided and for the specific day, logs are collected in a time period (for example, one month) different from the certain time period, and the energy saving operation pattern for the specific day can be determined based thereon. If the business transactions or processes are repeated in two or more different cycles, optimal energy saving patterns can be set for both cycles. As a result, if the operational status of the image forming apparatus differs in different units of repetition, such as in the case of a schedule repeated on weekly basis and a schedule repeated on monthly bases, the energy saving effect of the image forming apparatus can be maintained while not preventing decrease of working efficiency.

It is possible that in some departments, image forming apparatus 110 is fully turned off at night. In such a case, logs during the night time cannot be obtained. Therefore, in the auto mode, the energy saving operation pattern of the corresponding time slots cannot be determined. To cope with this situation, it is possible to determine a default energy saving operation pattern (default schedule) in advance and to allocate the default energy saving operation pattern to the time slot of which logs could not be obtained. Typically, it is appropriate to set the "power saving" operational mode as the default mode. That the logs cannot be collected means it is not much necessary to keep active the image forming apparatus 100 in the corresponding time slot.

Regarding the display of energy saving operation pattern table 358 shown in FIG. 8, if the default value is allocated, the display may be made different from other portions (for example, the corresponding portion may be displayed in gray), or the display may be the same as other portions. It would be convenient if switching between such manners of display is possible.

In the description of the system in accordance with the present embodiment, the energy saving operation pattern is confirmed and set by PC 190 for the administrator provided outside of image forming apparatus 100, through the web server in image forming apparatus 100. When the energy saving operation pattern is to be set in the system of the present embodiment, however, it is possible to set using touch-panel display 130 of image forming apparatus 100, as described above.

In the system of the present embodiment, the energy saving operation pattern is learned day by day for each specific day and time slot by time slot (hourly). The present invention, however, is not limited to such an embodiment. By way of example, the time slot may be made shorter or longer. The time slots may have different lengths. For instance, time slot of one hour may be used for management during daytime, and time slot of three hours may be used for the night time.

In the system of the present embodiment, colors of the cells of Table 50 are made different. The present system, however, is not limited to such an embodiment. The energy saving operation patterns may be represented using characters, figures or icons.

Though an example in which energy saving operation pattern table 358 is fully displayed on the screen has been described above, energy saving operation pattern table 358 may be made scrollable in up/down directions, considering a screen having small height. Further, day-by-day or time slot-by-time slot display using tabs is also possible, so that the display can be switched on the screen. It is noted, however, that the 24 hour, one-week display shown in FIG. 8 is visually friendly and preferred.

In the system of the present embodiment, the energy saving operation patterns are classified to four stages in accordance with the rate of operation. The present system, however, is not limited to such an embodiment. The energy saving operation patterns may be classified to larger number of stages, or smaller number of stages. Further, the rate of operation may be calculated by a numerical value as in the modification described above, and the time before suspended state is entered may be changed as a function of the numerical value.

In the embodiment above, the first group is classified by days of the week, and the second group is classified only by the day. Therefore, each group belonging to the first group appears repeatedly (periodically) in a constant order, and the frequency of appearance is equal among the groups. The second group is slightly different since there are long and short months. The groups, however, appear in order in a substantially similar manner. The present invention, however, is not limited to such classification of groups.

By way of example, order of appearance of groups may be such that a day belonging to a certain group appears at a higher frequency or lower frequency than a day belonging to another group. For instance, assume that work pattern of Friday differs on alternate weeks, in a place of business. Then, one group may be formed for each of Monday to Thursday, and two groups may be formed for Friday as there are two different patterns every other week, and hence, a total of eight groups may be formed. Various other classifications of groups may be possible, appropriately considering actual conditions of the place of business.

In the embodiment above, up to three days may be set as the specific days. It is unnecessary to limit the number of days settable as the specific days. By way of example, considering repetition on annual basis, the number of specific days may be much larger than three. Even in that case, the invention is readily applicable, basically by setting the number of specific days to be an arbitrary number larger than 3.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus having an electrically operated device, the image forming apparatus having a processor and a storage unit that stores a program executed by the processor and capable of power-saving control, comprising:
    a controller performed by the processor, the program causing the controller to execute,
        a first control performing power-saving control of said image forming apparatus independent of an operational status of said image forming apparatus on a day or in a time slot set by a user;
        a second control learning power-saving control of said image forming apparatus based on the operational status of said image forming apparatus, and performing power-saving control of said image forming apparatus in accordance with a result of learning; and
        a third control applying either said first control or said second control with priority to power-saving control of said image forming apparatus, wherein
    said third control applies, to the power-saving control of said electrically operated device of said image forming apparatus, said first control with priority over said second control on the day or in the time slot set by said user, and applies said second control with priority over said first control on other days or in other time slots, and after said result of learning is set to be reflected on the power-saving control, said result of learning is dynamically reflected on the power-saving control by said second control, wherein the image forming apparatus further includes:
a first user interface that allows a user to select a learning mode; and
a second user interface that allows the user to select a manual mode while the learning mode is being selected.

2. The image forming apparatus according to claim 1, further comprising:
a web, wherein
the program causes the controller to execute,
a first setting, setting as to whether or not learning of said second control is to be conducted, by communicating with a client computer through a server.

3. The image forming apparatus according to claim 2, wherein
the program causes the controller to execute,
a second setting, setting a day or a time slot in which said third control applies said first control with priority to the power-saving control, by communicating with a client computer through said server.

4. The image forming apparatus according to claim 3, wherein
the program causes the controller to perform,
said second setting, displaying a calendar on a display device of said client computer; and
a setting receiving, receiving, using said calendar, a setting of the day on which said third control applies said first control with priority to the power-saving control.

5. The image forming apparatus according to claim 2, capable of power-saving control in accordance with any of a plurality of power-saving modes, wherein
the program causes the controller to execute,
a power-saving mode receiving, receiving an input by a user concerning in which of said plurality of power-saving modes the power-saving control is to be performed; and wherein
at least one of said first and second control performs power-saving control of said image forming apparatus in accordance with the received power-saving mode.

6. The image forming apparatus according to claim 1, capable of power-saving control in accordance with any of a plurality of power-saving modes, wherein
the program causes the controller to perform,
a power-saving mode receiving, receiving an input by a user concerning in which of said plurality of power-saving modes the power-saving control is to be performed; and wherein
at least one of said first and second control performs power-saving control of said image forming apparatus in accordance with the received power-saving mode.

7. The image forming apparatus according to claim 1, further comprising:

a server; and
a learning result display device configured to display a result of learning of said second control, on a display device of a client computer by communicating with said client computer through said server.

8. The image forming apparatus according to claim 7, capable of power-saving control in accordance with any of a plurality of power-saving modes; wherein
said second control determines, based on the status of operation of said image forming apparatus, in which of said plurality of power-saving modes the power-saving control of said image forming apparatus is to be performed on a day-by-day or time slot-by-time slot basis; and
said learning result display device displays the result of learning of said second control on said display device of said client computer, on said day-by-day or time slot-by-time slot basis such that different power-saving modes can be distinguished from each other, by communicating with the client computer through said server.

9. The image forming apparatus according to claim 1, wherein the electrically operated device includes a heating and fixing unit.

10. A method of power-saving control in an image forming apparatus having an electrically operated device, the image forming apparatus having a processor and a storage unit that stores a program executed by the processor and capable of power-saving control, comprising the steps of:
learning power-saving control of said image forming apparatus based on an operational status of operation of said image forming apparatus; and
applying, to the power-saving control of said image forming apparatus, either a first process of performing power-saving control of said image forming apparatus independent of the operational status of said image forming apparatus, or a second process of performing power-saving control of said image forming apparatus in accordance with a result of said step of learning, with priority over the other on a day or in a time slot in accordance with user setting, wherein
said applying step applies to the power-saving control to said electrically operated device of said image forming apparatus, said first process with priority over said second process on the day or in the time slot set by said user, and applies said second process with priority over said first process on other days or in other time slots, and
after said result of learning is set to be reflected on the power-saving control, said result of learning is dynamically reflected on the power-saving control by said second process.
the method further including the steps of:
displaying a first interface that allows a user to select a learning mode; and
displaying a second user interface that allows the user to select a manual mode while the learning mode is being selected.

11. The method of power-saving control according to claim 10, wherein the electrically operated device includes a heating and fixing unit.

* * * * *